United States Patent
Ohno et al.

(10) Patent No.: US 7,811,650 B2
(45) Date of Patent: *Oct. 12, 2010

(54) HONEYCOMB STRUCTURE

(75) Inventors: Kazushige Ohno, Ibi-gun (JP); Masafumi Kunieda, Ibi-gun (JP); Kazutake Ogyu, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 579 days.

This patent is subject to a terminal disclaimer.

(21) Appl. No.: 11/173,056

(22) Filed: Jul. 5, 2005

(65) Prior Publication Data
US 2005/0266992 A1 Dec. 1, 2005

Related U.S. Application Data

(63) Continuation-in-part of application No. PCT/JP2004/018866, filed on Dec. 10, 2004, now abandoned.

(30) Foreign Application Priority Data

| Dec. 26, 2003 | (JP) | ................ 2003-435368 |
| May 11, 2004 | (JP) | ................ 2004-141282 |
| Jul. 22, 2004 | (JP) | ................ 2004-214729 |

(51) Int. Cl.
- *B32B 3/12* (2006.01)
- *B01J 21/04* (2006.01)
- *C04B 33/34* (2006.01)
- *C04B 37/00* (2006.01)
- *B01D 39/06* (2006.01)
- *B01D 39/20* (2006.01)
- *B01D 39/14* (2006.01)
- *B01D 46/00* (2006.01)

(52) U.S. Cl. ............... 428/116; 502/439; 156/89.22; 55/523; 55/524; 55/529

(58) Field of Classification Search ............ 55/523, 55/385.3, 483, 524, 529, DIG. 30; 428/327, 428/116, 117, 119, 188, 690, 913, 323; 502/493, 502/439; 156/89, 89.22
See application file for complete search history.

(56) References Cited

U.S. PATENT DOCUMENTS 5,518,678 A * 5/1996 Miyamoto et al. ..... 264/177.12

(Continued)

FOREIGN PATENT DOCUMENTS

DE 43 41 159 A1 6/1995

(Continued)

OTHER PUBLICATIONS

Derwent abstract of JP 05-213681, Ishikawa et al. Aug. 24, 1993.*
U.S. Appl. No. 11/925,394.

(Continued)

*Primary Examiner*—Steven Bos
*Assistant Examiner*—Anthony J Zimmer
(74) *Attorney, Agent, or Firm*—Oblon, Spivak, McClelland, Maier & Neustadt, L.L.P.

(57) ABSTRACT

A honeycomb structure 10 of the present invention comprises: porous honeycomb units 11 having multiple through-holes, including the first form of an inorganic material (for example, ceramic particles), the second form of an inorganic material (for example, inorganic fibers or ceramic particles having large particle sizes), and an inorganic binder; and sealing material layers 14 jointing the porous honeycomb units 11 at outer surfaces 13 where the through-holes are not open. The cross-sectional area perpendicular to the through-holes is about 5 to about 50 cm². The ratio of the total cross-sectional area of the porous honeycomb units 11 to the cross-sectional area of the honeycomb structure 10 is not less than about 85%. The honeycomb structure 10 reduces thermal stress or vibration applied to each porous honeycomb unit 11, by the sealing material layers 14, and allows for a more effective use of surface on which catalyst components are dispersed.

19 Claims, 17 Drawing Sheets

U.S. PATENT DOCUMENTS

| | | | |
|---|---|---|---|
| 6,159,578 A * | 12/2000 | Ichikawa | 428/118 |
| 7,393,376 B2 * | 7/2008 | Taoka et al. | 55/523 |
| 2005/0180898 A1 * | 8/2005 | Yamada | 422/180 |
| 2005/0227869 A1 | 10/2005 | Ohno et al. | |
| 2005/0266992 A1 | 12/2005 | Ohno et al. | |
| 2006/0172113 A1 | 8/2006 | Kunieda | |
| 2006/0177629 A1 | 8/2006 | Kunieda | |
| 2006/0263574 A1 | 11/2006 | Tsunekawa et al. | |
| 2006/0292044 A1 | 12/2006 | Ohno et al. | |
| 2006/0292330 A1 | 12/2006 | Ohno et al. | |
| 2006/0292331 A1 | 12/2006 | Ohno et al. | |
| 2006/0292332 A1 | 12/2006 | Ohno et al. | |
| 2006/0292333 A1 | 12/2006 | Ohno et al. | |
| 2006/0292334 A1 | 12/2006 | Ohno et al. | |
| 2006/0292335 A1 | 12/2006 | Ohno et al. | |
| 2006/0292336 A1 | 12/2006 | Ohno et al. | |
| 2006/0292337 A1 | 12/2006 | Ohno et al. | |
| 2006/0292338 A1 | 12/2006 | Ohno et al. | |
| 2006/0292339 A1 | 12/2006 | Ohno et al. | |
| 2006/0292340 A1 | 12/2006 | Ohno et al. | |
| 2006/0292341 A1 | 12/2006 | Ohno et al. | |
| 2006/0292342 A1 | 12/2006 | Ohno et al. | |
| 2006/0292393 A1 | 12/2006 | Kunieda | |
| 2007/0004592 A1 | 1/2007 | Ohno et al. | |
| 2007/0004593 A1 | 1/2007 | Ohno et al. | |
| 2007/0039295 A1 | 2/2007 | Ohno et al. | |
| 2007/0077190 A1 | 4/2007 | Ohno | |
| 2008/0118701 A1 | 5/2008 | Ohno et al. | |
| 2008/0119355 A1 | 5/2008 | Ohno et al. | |
| 2008/0176028 A1 | 7/2008 | Ohno et al. | |
| 2008/0187713 A1 | 8/2008 | Ohno et al. | |
| 2008/0241003 A1 | 10/2008 | Ido et al. | |
| 2008/0241005 A1 | 10/2008 | Ido et al. | |
| 2008/0241008 A1 | 10/2008 | Ido et al. | |
| 2008/0260991 A1 | 10/2008 | Konstandopoulos et al. | |
| 2009/0095416 A1 | 4/2009 | Kunieda et al. | |

FOREIGN PATENT DOCUMENTS

| | | |
|---|---|---|
| EP | 1 142 619 A1 | 10/2001 |
| EP | 1142619 A1 * | 10/2001 |
| EP | 1 249 262 A1 | 10/2002 |
| EP | 1 479 881 A1 | 11/2004 |
| JP | 5-213681 | 8/1993 |
| JP | 8-12460 | 1/1996 |
| JP | 10-263416 | 10/1998 |
| JP | 2001-96116 | 4/2001 |
| JP | 2001-97777 | 4/2001 |
| WO | WO 03/067041 A1 | 8/2003 |

OTHER PUBLICATIONS

U.S. Appl. No. 11/853,658.
U.S. Appl. No. 11/928,546.
U.S. Appl. No. 12/238,057, filed Sep. 25, 2008.
U.S. Appl. No. 12/245,821, filed Oct. 6, 2008.
U.S. Appl. No. 12/246,899, filed Oct. 7, 2008.
U.S. Appl. No. 12/246,881, filed Oct. 7, 2008.
U.S. Appl. No. 12/239,342, filed Sep. 26, 2008.
U.S. Appl. No. 12/246,913, filed Oct. 7, 2008.
U.S. Appl. No. 12/246,869, filed Oct. 7, 2008.
U.S. Appl. No. 12/248,647, filed Oct. 9, 2008.
U.S. Appl. No. 12/248,675, filed Oct. 9, 2008.
Narottam P. Bansal et al, "Effects of High-Temperature Annealing in Air on Hi-Nicalon Fiber-Reinforced Celsian Matrix Composites", NASA/TM-2008-215221, pp. 1-16.

* cited by examiner

Fig. 1
(a)
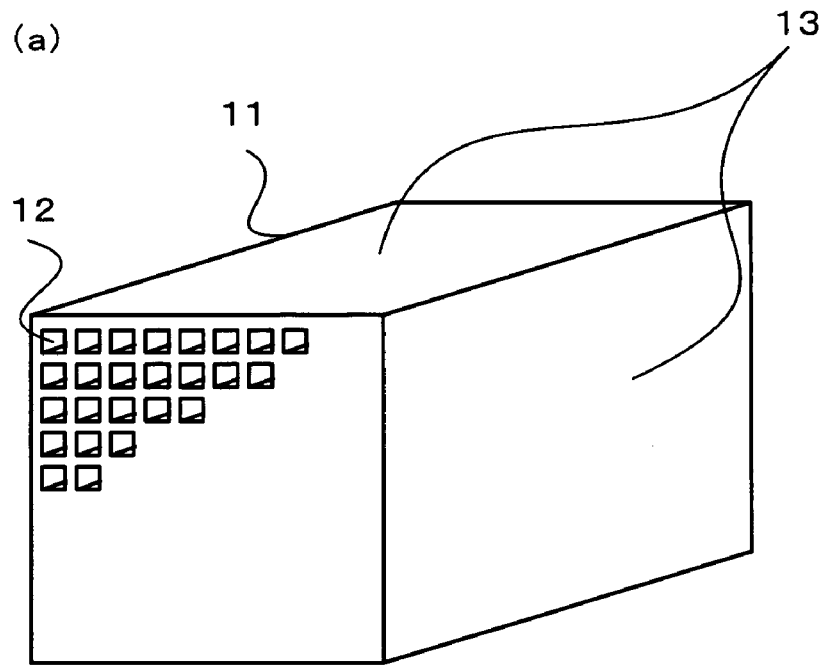
(b) HONEYCOMB STRUCTURE 10
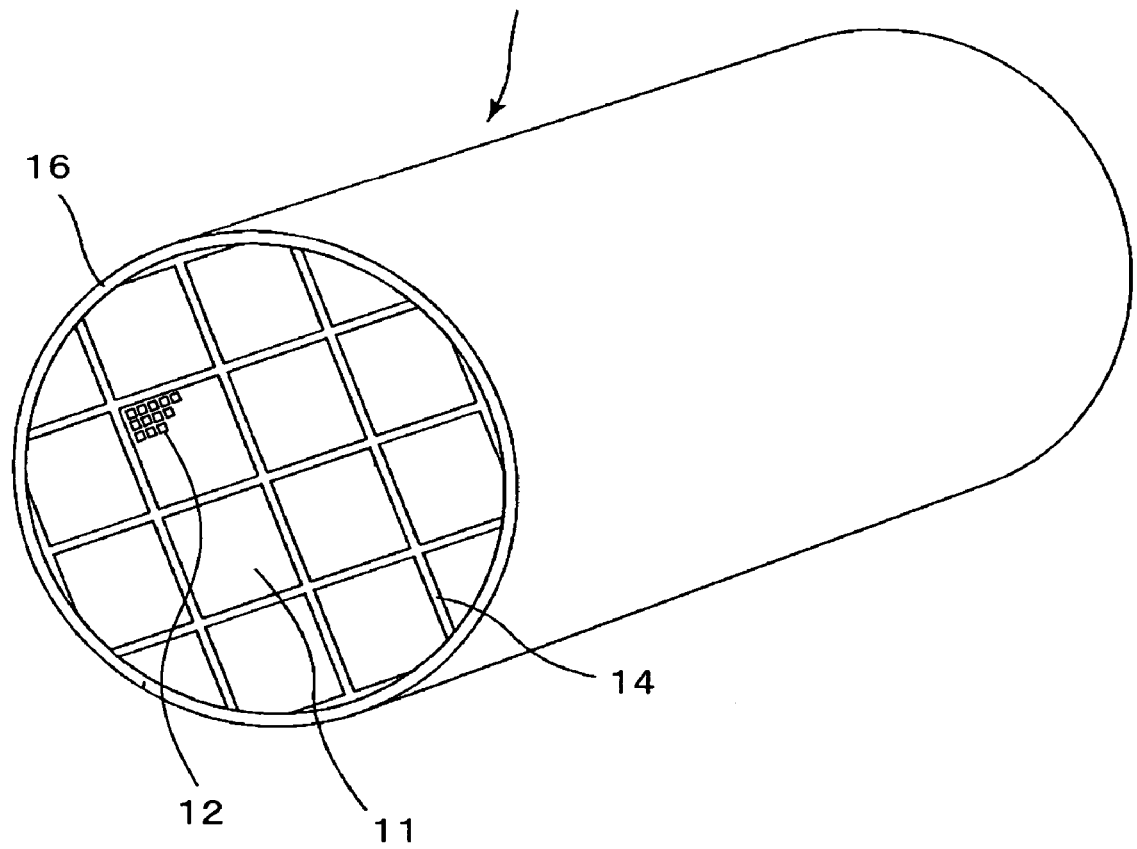

Fig. 2
(a)
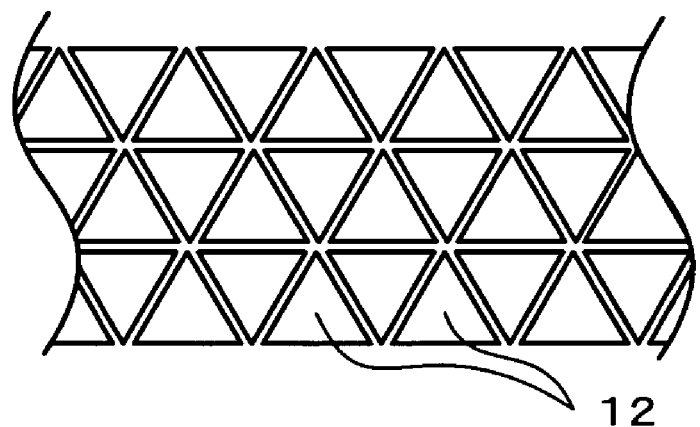
(b)
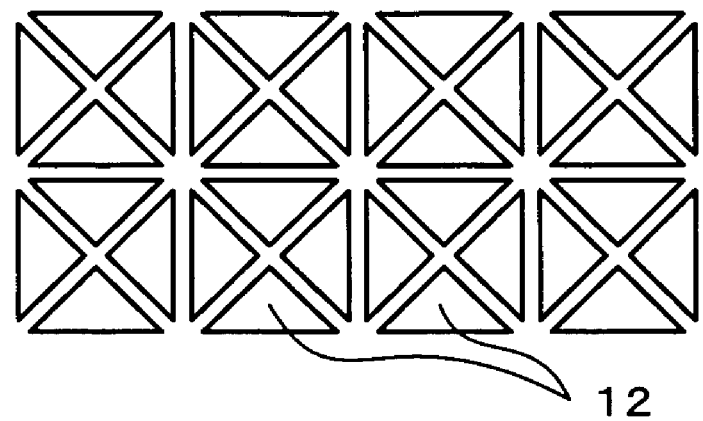
(c)
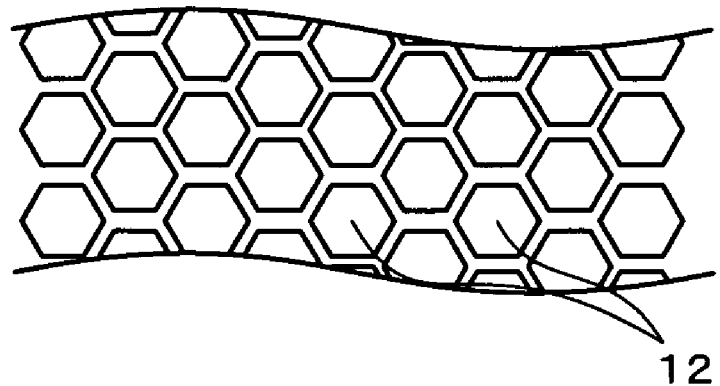

Fig. 4

| Examples[*1] | Inorganic Material of First Form | Unit Shape | | Unit Cross Section Area | Unit Area Ratio | Sealing Material Layer Area[*2] Ratio |
|---|---|---|---|---|---|---|
| | Ceramic Particles | cm | | cm$^2$ | % | % |
| Example 1 | Alumina | 3.43 | square | 11.8 | 93.5 | 6.5 |
| Example 2 | Alumina | 2.00 | square | 4.0 | 89.7 | 10.3 |
| Example 3 | Alumina | 2.24 | square | 5.0 | 90.2 | 9.8 |
| Example 4 | Alumina | 7.09 | fan | 39.5 | 96.9 | 3.1 |
| Example 5 | Alumina | 7.10 | square | 50.0 | 95.5 | 4.5 |
| Example 6 | Alumina | 7.41 | square | 55.0 | 95.6 | 4.4 |
| Example 7 | Alumina | integral body | | 162.0 | 100.0 | 0.0 |
| Example 8 | Titania | 3.43 | square | 11.8 | 93.5 | 6.5 |
| Example 9 | Titania | 2.00 | square | 4.0 | 89.7 | 10.3 |
| Example 10 | Titania | 2.24 | square | 5.0 | 90.2 | 9.8 |
| Example 11 | Titania | 7.09 | fan | 39.5 | 96.9 | 3.1 |
| Example 12 | Titania | 7.10 | square | 50.0 | 95.5 | 4.5 |
| Example 13 | Titania | 7.41 | square | 55.0 | 95.6 | 4.4 |
| Example 14 | Titania | integral body | | 162.0 | 100.0 | 0.0 |
| Example 15 | Silica | 3.43 | square | 11.8 | 93.5 | 6.5 |
| Example 16 | Silica | 2.00 | square | 4.0 | 89.7 | 10.3 |
| Example 17 | Silica | 2.24 | square | 5.0 | 90.2 | 9.8 |
| Example 18 | Silica | 7.09 | fan | 39.5 | 96.9 | 3.1 |
| Example 19 | Silica | 7.10 | square | 50.0 | 95.5 | 4.5 |
| Example 20 | Silica | 7.41 | square | 55.0 | 95.6 | 4.4 |
| Example 21 | Silica | integral body | | 162.0 | 100.0 | 0.0 |
| Example 22 | Zirconia | 3.43 | square | 11.8 | 93.5 | 6.5 |
| Example 23 | Zirconia | 2.00 | square | 4.0 | 89.7 | 10.3 |
| Example 24 | Zirconia | 2.24 | square | 5.0 | 90.2 | 9.8 |
| Example 25 | Zirconia | 7.09 | fan | 39.5 | 96.9 | 3.1 |
| Example 26 | Zirconia | 7.10 | square | 50.0 | 95.5 | 4.5 |
| Example 27 | Zirconia | 7.41 | square | 55.0 | 95.6 | 4.4 |
| Example 28 | Zirconia | integral body | | 162.0 | 100.0 | 0.0 |
| Example 29 | Cordierite + Alumina | integral body | | 162.0 | 100.0 | 0.0 |

[*1] Inorganic material of the second form: Silica-alumina fibers (particle diameter:10 μm, length: 100 μm, aspect ratio: 10)
[*2] Coating material layer area is included.

Fig. 5

| Examples[*1] | Inorganic Material of Second Form | | | | Particle Size | Unit Shape | | Unit Cross Section Area[*2] |
|---|---|---|---|---|---|---|---|---|
| | Material | Diameter | Length | Aspect Ratio | | | | |
| | | μm | μm | | μm | cm | | cm² |
| Example 1 | Silica-alumina fibers | 10 | 100 | 10 | | 3.43 | square | 11.8 |
| Example 30 | Silica-alumina fibers | 5 | 50 | 10 | | 3.43 | square | 11.8 |
| Example 31 | Silica-alumina fibers | 10 | 20 | 2 | | 3.43 | square | 11.8 |
| Example 32 | Silica-alumina fibers | 10 | 5000 | 500 | | 3.43 | square | 11.8 |
| Example 33 | Silica-alumina fibers | 10 | 10000 | 1000 | | 3.43 | square | 11.8 |
| Example 34 | Silica-alumina fibers | 10 | 20000 | 2000 | | 3.43 | square | 11.8 |
| Example 35 | γ-alumina | | | | 2 | 3.43 | square | 11.8 |
| Example 36 | α-alumina | | | | 5 | 3.43 | square | 11.8 |
| Example 37 | α-alumina | | | | 10 | 3.43 | square | 11.8 |
| Example 38 | α-alumina | | | | 20 | 3.43 | square | 11.8 |
| Example 39 | α-alumina | | | | 30 | 3.43 | square | 11.8 |
| Example 40 | α-alumina | | | | 50 | 3.43 | square | 11.8 |
| Example 41 | α-alumina | | | | 60 | 3.43 | square | 11.8 |
| Example 42 | α-alumina | | | | 80 | 3.43 | square | 11.8 |
| Example 43 | α-alumina | | | | 100 | 3.43 | square | 11.8 |

*1 Inorganic material of the first form: γ-alumina ceramic particles
*2 Unit area ratio: 93.5%, Area ratio of sealing material layer and coating material layer: 6.5%

Fig. 6

| Examples[*1] | Material of Inorganic Binder | Unit Cross Section Area | Thickness of Sealing Material Layer | Unit Area Ratio | Sealing Material Layer Area[*2] Ratio | Sintering Temperature |
|---|---|---|---|---|---|---|
| | | cm² | mm | % | % | °C |
| Example 44 | Silica sol | 11.8 | 2.0 | 89.3 | 10.7 | 800 |
| Example 45 | Silica sol | 11.8 | 3.0 | 84.8 | 15.2 | 800 |
| Example 46 | Silica sol | 5.0 | 2.0 | 83.5 | 16.5 | 800 |
| Example 47 | Silica sol | 5.0 | 1.5 | 86.8 | 13.2 | 800 |
| Example 48 | Alumina sol | 11.8 | 1.0 | 93.5 | 6.5 | 800 |
| Example 49 | Sepiolite | 11.8 | 1.0 | 93.5 | 6.5 | 800 |
| Example 50 | Attapulgite | 11.8 | 1.0 | 93.5 | 6.5 | 800 |
| Example 51 | — | 11.8 | 1.0 | 93.5 | 6.5 | 1000 |

*1 Inorganic material of the first form: γ-alumina ceramic particles
Inorganic material of the second form: Silica-alumina fibers (particle diameter: 10 μm, length: 100 μm, aspect ratio: 10)
*2 Coating material layer area is included Fig. 7
(a) Example 1
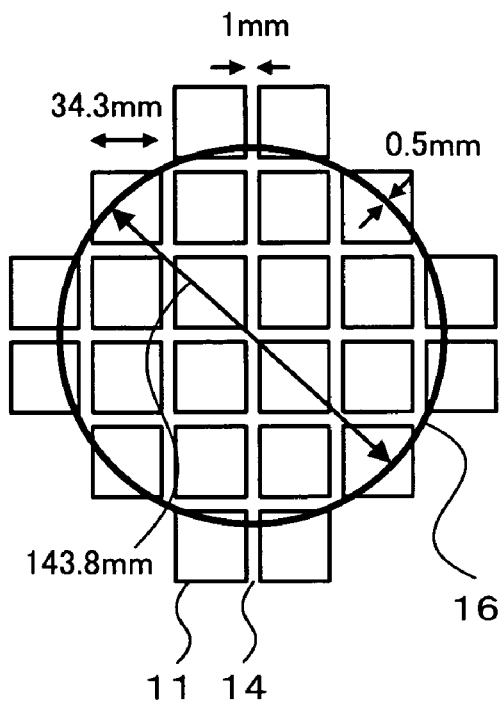
(b) Example 2
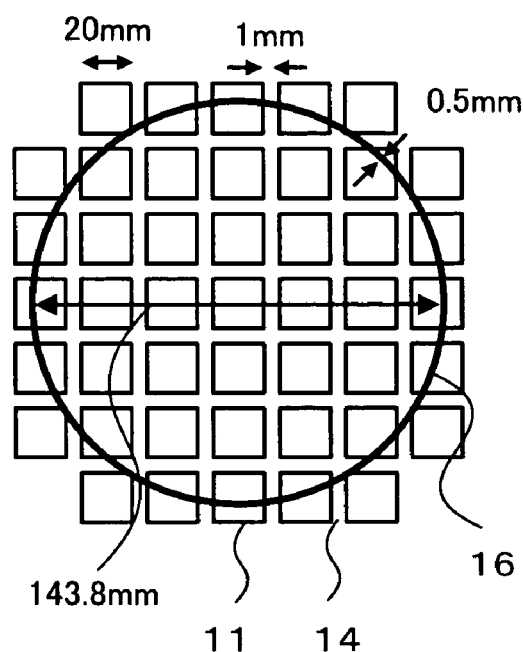
(c) Example 3
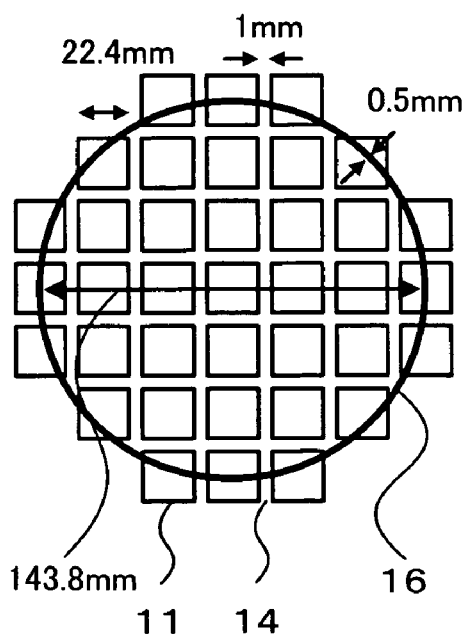
(d) Example 4
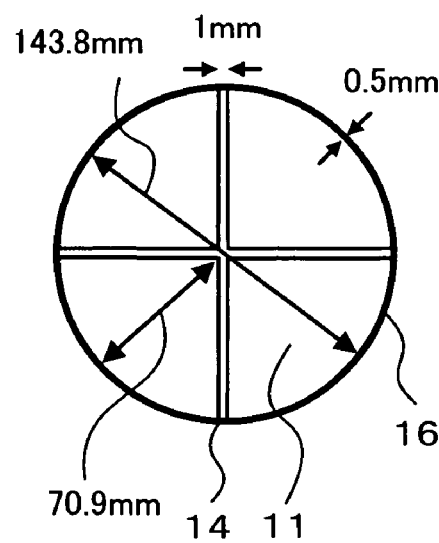

Fig. 8
(a) Example 5
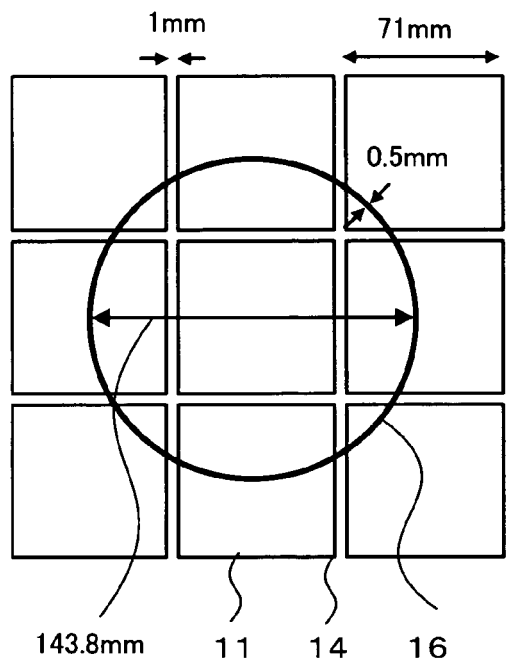
(b) Example 6
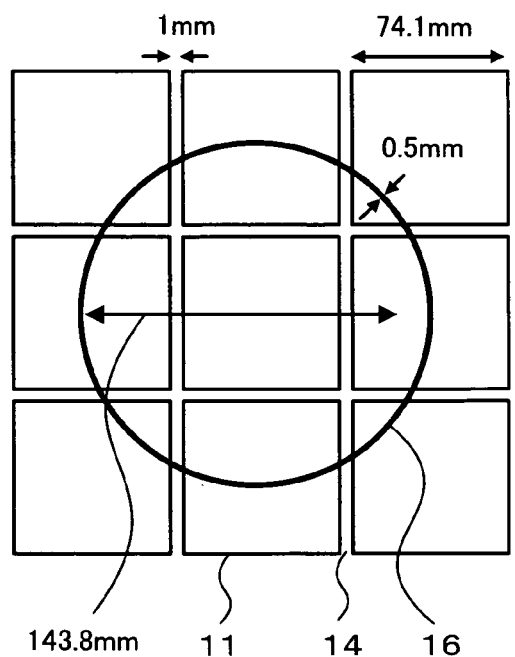
(c) Example 7
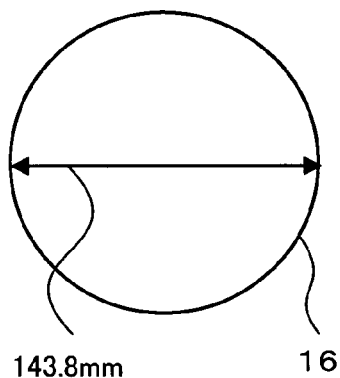

Fig. 11

| Examples[*1] | Inorganic Material of First Form | Unit Cross Section Area | Unit Area Ratio | Specific Surface Area of Honeycomb Units | Specific Surface Area S of Honeycomb Structures | Reduction Rate G | Pressure Loss |
|---|---|---|---|---|---|---|---|
| | Ceramic Particles | cm$^2$ | % | m$^2$/L | m$^2$/L | % by weight | kPa |
| Example 1 | Alumina | 11.8 | 93.5 | 42000 | 39270 | 0 | 2.4 |
| Example 2 | Alumina | 4.0 | 89.7 | 42000 | 37674 | 0 | 2.8 |
| Example 3 | Alumina | 5.0 | 90.2 | 42000 | 37884 | 0 | 2.5 |
| Example 4 | Alumina | 39.5 | 96.9 | 42000 | 40698 | 5 | 2.2 |
| Example 5 | Alumina | 50.0 | 95.5 | 42000 | 40110 | 3 | 2.3 |
| Example 6 | Alumina | 55.0 | 95.6 | 42000 | 40152 | 52 | 2.3 |
| Example 7 | Alumina | 162.0 | 100.0 | 42000 | 42000 | 70 | 2.1 |
| Example 8 | Titania | 11.8 | 93.5 | 38000 | 35530 | 0 | 2.4 |
| Example 9 | Titania | 4.0 | 89.7 | 38000 | 34086 | 0 | 2.8 |
| Example 10 | Titania | 5.0 | 90.2 | 38000 | 34276 | 0 | 2.5 |
| Example 11 | Titania | 39.5 | 96.9 | 38000 | 36822 | 7 | 2.2 |
| Example 12 | Titania | 50.0 | 95.5 | 38000 | 36290 | 5 | 2.3 |
| Example 13 | Titania | 55.0 | 95.6 | 38000 | 36328 | 63 | 2.3 |
| Example 14 | Titania | 162.0 | 100.0 | 38000 | 38000 | 90 | 2.1 |
| Example 15 | Silica | 11.8 | 93.5 | 41000 | 38335 | 0 | 2.4 |
| Example 16 | Silica | 4.0 | 89.7 | 41000 | 36777 | 0 | 2.8 |
| Example 17 | Silica | 5.0 | 90.2 | 41000 | 36982 | 0 | 2.5 |
| Example 18 | Silica | 39.5 | 96.9 | 41000 | 39729 | 4 | 2.2 |
| Example 19 | Silica | 50.0 | 95.5 | 41000 | 39155 | 3 | 2.3 |
| Example 20 | Silica | 55.0 | 95.6 | 41000 | 39196 | 42 | 2.3 |
| Example 21 | Silica | 162.0 | 100.0 | 41000 | 41000 | 65 | 2.1 |
| Example 22 | Zirconia | 11.8 | 93.5 | 41500 | 38803 | 0 | 2.4 |
| Example 23 | Zirconia | 4.0 | 89.7 | 41500 | 37226 | 0 | 2.8 |
| Example 24 | Zirconia | 5.0 | 90.2 | 41500 | 37433 | 0 | 2.5 |
| Example 25 | Zirconia | 39.5 | 96.9 | 41500 | 40214 | 5 | 2.2 |
| Example 26 | Zirconia | 50.0 | 95.5 | 41500 | 39633 | 3 | 2.3 |
| Example 27 | Zirconia | 55.0 | 95.6 | 41500 | 39674 | 57 | 2.3 |
| Example 28 | Zirconia | 162.0 | 100.0 | 41500 | 41500 | 83 | 2.1 |
| Example 29 | Cordierite + Alumina | 162.0 | 100.0 | 25000 | 25000 | 0 | 2.9 |
| Example 44 | Alumina | 11.8 | 89.3 | 42000 | 37506 | 0 | 3.1 |
| Example 45 | Alumina | 11.8 | 84.8 | 42000 | 35616 | 0 | 4.3 |
| Example 46 | Alumina | 5.0 | 83.5 | 42000 | 35070 | 0 | 4.4 |
| Example 47 | Alumina | 5.0 | 86.8 | 42000 | 36456 | 0 | 3.3 |

[*1] Inorganic material of the second form: Silica-alumina fibers (particle diameter: 10 μm, length: 100 μm, aspect ratio: 10)

Fig. 14

| Examples[*1] | Silica-alumina Fibers | | | Specific Surface Area of Honeycomb Units | Specific Surface Area S of Honeycomb Structures | Reduction Rate G | Pressure Loss |
|---|---|---|---|---|---|---|---|
| | Diameter | Length | Aspect Ratio | | | | |
| | μm | μm | | $m^2/L$ | $m^2/L$ | % by weight | kPa |
| Example 1 | 10 | 100 | 10 | 42000 | 39270 | 0 | 2.4 |
| Example 30 | 5 | 50 | 10 | 42000 | 39270 | 2 | 2.4 |
| Example 31 | 10 | 20 | 2 | 42000 | 39270 | 8 | 2.4 |
| Example 32 | 10 | 5000 | 500 | 42000 | 39270 | 4 | 2.4 |
| Example 33 | 10 | 10000 | 1000 | 42000 | 39270 | 6 | 2.4 |
| Example 34 | 10 | 20000 | 2000 | 42000 | 39270 | 25 | 2.4 |

[*1] Inorganic material of the first form: γ-alumina ceramic particles

Fig. 16

| Examples[*1] | Prticle Size of α-alumina | Unit Shape | | Specific Surface Area of Honeycomb Units | Specific Surface Area S of Honeycomb Structures | Reduction Rate G | Pressure Loss |
|---|---|---|---|---|---|---|---|
| | μm | cm | | m²/L | m²/L | % by weight | kPa |
| Example 35 | 2(γ-alumina) | 3.43 | square | 42000 | 39270 | 90 | 2.4 |
| Example 36 | 5 | 3.43 | square | 42000 | 39270 | 80 | 2.4 |
| Example 37 | 10 | 3.43 | square | 42000 | 39270 | 20 | 2.4 |
| Example 38 | 20 | 3.43 | square | 42000 | 39270 | 14 | 2.4 |
| Example 39 | 30 | 3.43 | square | 42000 | 39270 | 14 | 2.4 |
| Example 40 | 50 | 3.43 | square | 42000 | 39270 | 15 | 2.4 |
| Example 41 | 60 | 3.43 | square | 42000 | 39270 | 20 | 2.4 |
| Example 42 | 80 | 3.43 | square | 42000 | 39270 | 40 | 2.4 |
| Example 43 | 100 | 3.43 | square | 42000 | 39270 | 80 | 2.4 |

[*1] Inorganic material of the first form: γ-alumina ceramic particles

Fig. 18

| Examples[*1] | Material of Inorganic Binder | Unit Area Ratio | Sintering Tempreture | Specific Surface Area of Honeycomb Units | Specific Surface Area S of Honeycomb Structures | Reduction Rate G | Pressure Loss |
|---|---|---|---|---|---|---|---|
| | Material | % | °C | m²/L | m²/L | % by weight | kPa |
| Example 48 | Alumina sol | 93.5 | 800 | 42000 | 39270 | 0 | 2.4 |
| Example 49 | Sepiolite | 93.5 | 800 | 42000 | 39270 | 0 | 2.4 |
| Example 50 | Attapulgite | 93.5 | 800 | 42000 | 39270 | 0 | 2.4 |
| Example 51 | — | 93.5 | 1000 | 42000 | 39270 | 20 | 2.4 |

[*1] Inorganic material of the first form: γ-alumina ceramic particles
Inorganic material of the second form: Silica-alumina fibers (particle diameter: 10 μm, length: 10 μm, aspect ratio: 10)

HONEYCOMB STRUCTURE

CROSS REFERENCE TO RELATED APPLICATION

This is a continuation-in-part of Application No. PCT/JP2004/018866, filed on Dec. 10, 2004, now abandoned.

BACKGROUND ART

1. Technical Field

The present invention relates to a honeycomb structure.

2. Prior Art to be Disclosed

Conventionally, honeycomb catalysts generally used for conversion of automobile exhaust gases have been produced by supporting a material having a high specific surface area such as activated alumina and a catalyst metal such as platinum on the surface of a cordierite honeycomb structure having an integral structure and low thermal expansion. In addition, it also supports alkaline-earth metals such as Ba for NOx treatment as a NOx occlusion substance under oxygen excessive atmosphere in a lean-burn engine, a diesel engine and the like. In order to improve conversion performance, the carrier need to have a higher specific surface area and particles of noble metals need to be smaller in size and highly dispersed, thus the contact probability of exhaust gases with catalyst noble metals and NOx occlusion substances are increased. However, a simple increase of the supported amount of the material having the high specific surface area such as activated alumina causes an increase of alumina layer thickness or leads to disadvantage that the contact probability is not increased or a pressure loss becomes too large. Therefore, properties such as cell shape, cell density, and wall thickness have been devised. (Refer to, for example, Japanese Patent Application Laid-Open No. H10-263416.) Another known honeycomb structure is manufactured by extrusion molding a material of a high specific surface area with inorganic fibers and inorganic binder. (Refer to, for example, Japanese Patent Application Laid-Open No. H05-213681.) Furthermore, another known honeycomb structures includes multiple honeycomb units that are bound to each other via adhesive layers, so as to increase the size of the honeycomb structures. (Refer to, for example, German Patent Publication No. 4341159.)

However, conventional techniques described above have the following problems. In a material having a high specific surface area such as activated alumina, specific surface area of the material becomes smaller as sintering propagates through thermal aging. The supported catalyst metal on the material, such as platinum, accordingly coagulates, increases its particle size, and decreases its specific surface area. Therefore, in order to have the high specific surface area after thermal aging (in use as a carrier of a catalyst), the supporting material, needs to have a higher specific surface area at the initial stage. As described above, the contact probability of exhaust gases with catalyst noble metals and NOx occlusion substances needs to be increased to improve conversion performance. The carrier accordingly need to have a higher specific surface area and the particles of catalyst metals need to be smaller in size and highly dispersed. In the cordierite honeycomb structures described in Japanese Patent Application Laid-Open No. H10-263416, which support on their surfaces materials having high specific surface areas such as activated alumina and a catalyst metal such as platinum, characteristics such as cell shape, cell density, and wall thickness are devised in order to increase the contact probability with the exhaust gases, and the catalyst carriers were made to have higher specific surface area. However, their specific surface area is not large enough to sufficiently disperse catalyst metals and the exhaust gas conversion performance after thermal aging was insufficient. In order to solve this problem one proposed structure supports a large amount of catalyst metals on the carrier or enlarges the catalyst carrier itself. However, noble metals such as platinum are very expensive and limited precious resources. In addition, when the honeycomb structures are installed in an automobile, the space is tightly limited. For these reasons, either could not be appropriate measures.

The honeycomb structure shown in Japanese Patent Application Laid-Open No. H05-213681, which is made by extrusion molding of inorganic fibers and inorganic binders, has a high specific surface area as a carrier, since the base material itself is a material with a high specific surface area, and it is possible to disperse catalyst metals with high dispersion. However, base material such as alumina can not be sufficiently sintered for the sake of keeping specific surface area, and is very weak in strength. And, as described above, when it is installed in an automobile, the installation space is tightly limited. To increase the specific surface area per unit volume, measures such as thinning the partition walls are taken. Thus the strength of the base material is further reduced. Due to large thermal expansion coefficients, cracks caused by thermal stresses can easily occur in the base material such as alumina during sintering (calcination) or during usage. In view of these, the conventional honeycomb structure has such problems that, when used in an automobile, it can be easily broken and it can neither maintain its shape as a honeycomb structure nor perform a function as a catalyst carrier, since the thermal stress owing to rapid temperature changes and the external force such as large vibrations are exerted on it during usage.

Furthermore, in the catalyst carrier for automobiles described in DE4341159, in order to make a honeycomb structure larger, honeycomb units with cross-sectional areas of 200 cm² or more are disclosed. However, the catalyst carrier also has such problems that, when used under the thermal stress owing to rapid temperature changes and the external force such as large vibrations exerted, it can be easily broken and it can neither maintain its shape as a honeycomb structure nor perform a function as a catalyst carrier.

The contents of Japanese Patent Application Laid-Open No. H10-263416, Japanese Patent Application Laid-Open No. H05-213681, and German Patent Publication No. 4341159 are incorporated herein by reference in their entity.

SUMMARY OF THE INVENTION

The present invention is directed to a honeycomb structure including: porous honeycomb units that have multiple through-holes and include at least an inorganic material of a first form and an inorganic material of a second form, and have a cross-sectional area of about 5 to about 50 cm² perpendicular to the through-holes; and sealing material layers jointing two or more of the porous honeycomb units each other at outer surfaces where the through-holes are not open.

In this honeycomb structure, the cross-sectional area which is perpendicular to the through-holes of the honeycomb units jointed each other at the outer surfaces, where the through holes are not open, is specified.

In the honeycomb structure of the invention, the ratio of the total cross-sectional area of the porous honeycomb units to cross-sectional area of the honeycomb structure is preferably not less than about 85%.

The present invention is also directed to a honeycomb structure including: porous honeycomb units that have multiple through-holes and include at least an inorganic material of a first form and an inorganic material of a second form, and have a cross-sectional area of not more than about 50 cm² perpendicular to the through-holes; and sealing material layers jointing two or more of the porous honeycomb units at outer surfaces where the through-holes are not open, wherein the ratio of the total cross-sectional area of the porous honeycomb units to cross-sectional area of the honeycomb structure is not less than about 85%.

In this honeycomb structure, in addition to the cross-sectional area which is perpendicular to the through-holes of the honeycomb units jointed each other at the outer surfaces, the ratio of the total cross-sectional area of the porous honeycomb units to cross-sectional area of the honeycomb structure is specified.

In the honeycomb structure of the invention, the ratio of the total cross-sectional area of the porous honeycomb units to the cross-sectional area of the honeycomb structure is preferably not less than about 90%.

The honeycomb structure of the invention preferably includes a coating material layer covering outer periphery, where the through-holes are not open, of two or more of the porous honeycomb units jointed each other with the sealing material layers.

In the honeycomb structure of the invention, the inorganic material of the second form preferably has a function as a reinforcing material for the porous honeycomb units. In the honeycomb structure of the invention, the inorganic material of the first form is an inorganic material having a predetermined aspect ratio, and the inorganic material of the second form is an inorganic material preferably having an aspect ratio larger than the predetermined aspect ratio. Here, the aspect ratio of the inorganic material of the second form is preferably about 2 to about 1000.

In the honeycomb structure of the invention, it is preferable that the inorganic material of the first form is ceramic particles, and the inorganic material of the second form is inorganic fibers. In the present invention, the inorganic fibers are intended to include whiskers. In the honeycomb structure of the invention, the inorganic material of the first form is preferably ceramic particles having a predetermined particle size, and the inorganic material of the second form is preferably ceramic particles having a particle size larger than the predetermined particle size. Here, the inorganic material of the second form preferably has a particle size of about 5 times or more of the predetermined particle size.

The ceramic particle included in the honeycomb structure of the invention is preferably at least one kind of particles selected from the group including alumina, silica, zirconia, titania, ceria, and mullite.

The inorganic fiber included in the honeycomb structure of the invention is preferably at least one kind of inorganic fibers selected from the group including alumina, silica, silicon carbide, silica-alumina, glass, potassium titanate, and aluminum borate.

The inorganic binder included in the honeycomb structure of the invention is preferably at least one kind of inorganic binders selected from the group including alumina sol, silica sol, titania sol, water glass, sepiolite, and attapulgite. The honeycomb structure of the invention preferably supports a catalyst component. Here, the catalyst component is preferably at least one kind of components selected from the group including of noble metals, compounds of alkaline metals, compounds of alkaline-earth metals, and oxides.

The honeycomb structure of the invention is preferably used for exhaust gas conversion of automobiles.

In the honeycomb structure of the invention, a cross-section of the through-hole is preferably substantially triangular or substantially hexagonal.

The present invention is to provide a honeycomb structure having improved strength against thermal shock and vibration, as well as highly dispersed catalyst components.

DETAILED DESCRIPTION OF THE INVENTION

The present invention is directed to a honeycomb structure including: porous honeycomb units that have multiple through-holes and include at least an inorganic material of a first form and an inorganic material of a second form, and have a cross-sectional area of about 5 to about 50 cm² perpendicular to the through-holes; and sealing material layers jointing two or more of the porous honeycomb units each other at outer surfaces where the through-holes are not open.

In this honeycomb structure, multiple porous honeycomb units are jointed each other with the sealing material layers, thus its strength against thermal shock and vibration can be increased. It is presumed that, even if a wide range of temperature distribution is resulted from rapid temperature changes etc., the temperature difference in each porous honeycomb unit can be kept small. Or it is presumed that the thermal shock and vibration can be reduced by the sealing material layers. Furthermore, even if cracks occur in the porous honeycomb unit due to forces such as thermal stress, the sealing material layers are considered to prevent the cracks from propagating over the whole honeycomb structure, additionally to play the roll as the frame of the honeycomb structure, to maintain the shape, and to hold the function as a catalyst carrier. The cross-sectional area perpendicular to the through-holes (hereinafter abbreviated as the cross-sectional area), as the size of porous honeycomb unit, of less than about 5 cm² makes the cross-sectional area of the sealing material layers jointing the plurality of porous honeycomb units larger, thus resulting in a relatively smaller specific surface area supporting the catalyst and a relatively high pressure loss. On the other hand, the cross-sectional area of more than about 50 cm² makes the size of units too large, thus resulting in inadequate control of the thermal stress generated in each honeycomb unit. The cross-sectional area from about 5 to about 50 cm² allows for a larger specific surface area, a smaller pressure loss, sufficient strength against thermal stress, and high durability can be obtained. Thus the honeycomb structure becomes practical level. With this honeycomb structure, catalyst components can be highly dispersed and the strength against thermal shock or vibration can be improved. Here, the cross-sectional area refers to, when the honeycomb structure includes a plurality of porous honeycomb units having different cross-sectional areas, the cross-sectional area of the most fundamental porous honeycomb unit composing the honeycomb structure, and normally refers to the largest cross-sectional area of the porous honeycomb units. The ratio of the total cross-sectional area of porous honeycomb units to the cross-sectional area of the honeycomb structure is preferably not less than about 85%, more preferably not less than about 90%. The ratio of less than about 85% makes the cross-sectional area of sealing material layers larger and makes the total cross-sectional area of porous honeycomb units smaller, thus resulting in a relatively small specific surface area supporting the catalyst and a relatively high pressure loss. On the other hand, the ratio of not less than about 90% reduces a pressure loss.

The present invention is also directed to a honeycomb structure including: porous honeycomb units that have multiple through-holes and include at least an inorganic material of a first form and an inorganic material of a second form, and have a cross-sectional area of not more than about 50 cm² perpendicular to the through-holes; and sealing material layers jointing two or more of the porous honeycomb units at outer surfaces where the through-holes are not open, wherein the ratio of the total cross-sectional area of the porous honeycomb units to cross-sectional area of the honeycomb structure is not less than about 85%.

In this honeycomb structure, multiple porous honeycomb units are jointed each other with the sealing material layers, the strength against thermal shock or vibration can be improved. It is presumed that, even if a wide range of temperature distribution in the honeycomb structure is resulted from rapid temperature changes etc., the temperature difference in each porous honeycomb unit can be kept small. Or it is presumed that the thermal shock and vibration can be reduced by the sealing material layers. Furthermore, even if cracks occur in the porous honeycomb unit due to a thermal stress etc., the sealing material layers are considered to prevent the cracks from propagating over the whole honeycomb structure, additionally to play the roll as the frame of the honeycomb structure, to keep the shape, and to maintain the function as a catalyst carrier. The cross-sectional area of the porous honeycomb unit of more than about 50 cm² makes the size of units too large, and the thermal stress generated in each honeycomb unit can not be adequately controlled. In addition, since the buffer action of the sealing material layers against the thermal stress or vibration is reduced, the cross-sectional area is preferably not more than about 50 cm². When the ratio of the total cross-sectional area of the porous honeycomb units to the cross-sectional area of the honeycomb structure is less than about 85%, the cross-sectional area of materials other than the porous honeycomb units becomes large and the specific surface area supporting the catalyst becomes relatively small and the pressure loss becomes relatively high. Thus, this ratio is preferably not less than about 85%, more preferably not less than about 90%. With this honeycomb structure, catalyst components can be highly dispersed and the strength against thermal shock or vibration can be improved. Here, the cross-sectional area refers to, when the honeycomb structure includes a plurality of porous honeycomb units having different cross-sectional areas, the cross-sectional area of the most fundamental porous honeycomb unit composing the honeycomb structure, and normally refers to the largest cross-sectional area of the porous honeycomb units.

The honeycomb structure of the present invention may include a coating material layer covering outer periphery, where the through-holes are not open, of two or more of the porous honeycomb units jointed each other with the sealing material layers. This arrangement protects the outer periphery to improve the strength of the honeycomb structure.

The shape of the honeycomb structure made by jointing of porous honeycomb units is not particularly restricted and may be arbitrarily shaped and sized, for example, may be cylindrical, square-pillar, or elliptic cylindrial.

In the honeycomb structure of the present invention, the inorganic material of the second form may have a function as a reinforcing material for the porous honeycomb units. The inorganic material as such improves the strength of the honeycomb units.

In the honeycomb structure of the present invention, an inorganic material of the first form is an inorganic material having a predetermined aspect ratio (long side/short side), and an inorganic material of the second form may be an inorganic material having a larger aspect ratio than the predetermined aspect ratio. The inorganic material of the second form having the larger aspect ratio improves the strength of a porous honeycomb unit. The aspect ratio of the inorganic material of the second form is preferably about 2 to about 1000, more preferably about 5 to about 800, most preferably about 10 to about 500. When the aspect ratio of the inorganic material of the second form is less than about 2, its contribution to strength improvement of the honeycomb structure may become small. On the other hand, when the aspect ratio is more than about 1000, the inorganic material tends to clog in a molding die during molding and the moldability may become worse. In addition, the inorganic material is broken to cause variations in length during molding process such as extrusion molding, and its contribution to strength improvement of the honeycomb structure may accordingly become small. Here, when the inorganic material of the second form has a variation in aspect ratio, its averaged value may be used as the aspect ratio.

In the honeycomb structure of the present invention, an inorganic material the first form may be ceramic particles, and an inorganic material of the second form may be inorganic fibers. The specific surface area is increased by the ceramic particles, and the strength of the porous honeycomb units is increased by the inorganic fibers.

In the honeycomb structure of the present invention, an inorganic material of the first form may be ceramic particles with a predetermined particle size, and an inorganic material of the second form may be ceramic particles having a larger particle size than the predetermined particle size. The strength of the porous honeycomb units is increased by the ceramic particles having the larger particle size. In this case, the particle size of the inorganic material of the second form is preferably five times or more of the predetermined particle size, more preferably about 10 to about 30 times larger than the predetermined particle size. The particle size of the inorganic material of the second form is preferably about 10 to about 60 μm, more preferably about 20 to about 50 μm. When the particle size of the inorganic material of the second form is less than about 10 μm, the strength of the honeycomb structure can not be sufficiently increased. On the other hand, when the particle size is more than about 60 μm, the particles tend to clog in a molding die during molding and the moldability may become poor. When the inorganic material of the first form or the inorganic material of the second form has a variation in particle size, the averaged value may be used as the particle size. The ceramic particles of the inorganic material of the second form may be selected from different kinds of ceramic particles from that of the first embodiment described above. Also it may be selected from the same kind but having different shapes (for example, particle size etc.) or different properties (for example, different crystal form, different melting point, or the like). When ceramic particles are used as the inorganic material of the second form, since it can increase the strength of the honeycomb structure depending on its particle size, it may have the same aspect ratio as that of the inorganic material of the first form.

In the honeycomb structure of the present invention, when ceramic particles are used as an inorganic materials of the first or the second form, the ceramic particles included in the honeycomb structure is not particularly restricted and may be one or multiple kinds selected from the group including, for example, silicon carbide, silicon nitride, alumina, silica, zirconia, titania, ceria, and mullite can be included, and among them, alumina is preferable.

In the honeycomb structure of the present invention, when inorganic fibers are used as an inorganic materials of the first or the second form, the inorganic fibers included in the honeycomb structure is not particularly restricted and may be one or multiple kinds of inorganic fibers selected from the group including, for example, alumina, silica, silicon carbide, silica-alumina, glass, potassium titanate, and aluminum borate.

The amount of an inorganic material of the first form (such as ceramic particles) included in the honeycomb structure is preferably about 30 to about 97% by weight, more preferably about 30 to about 90% by weight, further preferably about 40 to about 80% by weight, most preferably about 50 to about 75% by weight. When the content of the inorganic material of the first form is less than about 30% by weight, the amount of the inorganic material of the first form contributing to the increase of specific surface area becomes relatively small, the specific surface area becomes small, and catalyst components can not be highly dispersed when supported. On the other hand, when the content is more than about 90% by weight, the amount of the inorganic material of the second form (such as inorganic fibers) contributing to the increase of strength becomes relatively small, and the strength of the honeycomb structure is reduced.

The amount of the inorganic material of the second form (inorganic fibers etc.) included in the honeycomb structure is preferably about 3 to about 70% by weight, more preferably about 3 to about 50% by weight, further preferably about 5 to about 40% by weight, most preferably about 8 to about 30% by weight. When the content of the inorganic material of the second form is less than about 3% by weight, the strength of the honeycomb structure decreases. On the other hand, when the content is more than about 50% by weight, the amount of the inorganic material of the first form (such as ceramic particles) contributing to the increase of specific surface area becomes relatively small, the specific surface area as the honeycomb structure becomes small, and catalyst components can not be highly dispersed when supported.

In the honeycomb structure of the present invention, the porous honeycomb units may further include inorganic binders. Even when the sintering temperature of the porous honeycomb units is lowered, the honeycomb structure can have sufficient strength. The inorganic binders included in the honeycomb structure is not particularly restricted, but may be, for example, inorganic sol and clay-type binders. Examples of inorganic sol include one or multiple kinds of inorganic sol selected from alumina sol, silica sol, titania sol, and water glass. Examples of clay-type binders include one or multiple kinds of clay-type binders selected from white clay, kaolin, montmorillonite, multi-chain-type clay (sepiolite and atta-pulgite). The amount of the inorganic binder included in the honeycomb structure, as the solid content included in the honeycomb structure, is preferably about 50% or less by weight, more preferably about 5 to about 50% by weight, further preferably about 10 to 40% by weight, most preferably about 15 to about 35% by weight. If the content of the inorganic binder is more than about 50% by weight, the moldability becomes poor.

The shape of the porous honeycomb units is, although not particularly restricted, preferably a shape with which the porous honeycomb units are easily jointed, and the cross-sectional plane perpendicular to through-holes (hereinafter abbreviated simply as the cross-section) may be square, rectangular, hexagonal, and fan-shaped. As an example of porous honeycomb units, a schematic diagram of a cuboid porous honeycomb unit 11 having a square cross-section is shown in FIG. 1(a). The porous honeycomb unit 11 has multiple through-holes 12 from the front side toward the deeper side, and an outer surface 13 without through-holes 12. The wall thickness between the adjacent through-holes 12 is, although not particularly restricted, preferably about 0.05 to about 0.35 mm, more preferably about 0.10 to about 0.30 mm, most preferably about 0.15 to about 0.25 mm. The wall thickness of less than about 0.05 mm reduces the strength of the porous honeycomb units, while the wall thickness of more than about 0.35 mm makes the contacting area with exhaust gases small and interferes sufficiently deep penetration of the gas. Thus, since the contact between the gases and the catalyst supported inside of the wall is hindered, the catalyst performance is reduced. The number of through-holes per unit cross-sectional area is preferably about 15.5 to about 186 cells/cm$^2$ (about 100 to about 1,200 cpsi), more preferably about 46.5 to about 170.5 cells/cm$^2$ (about 300 to about 1,100 cpsi), most preferably about 62.0 to about 155 cells/cm$^2$ (about 400 to about 1,000 cpsi). When the number of the through-holes is less than about 15.5 cells/cm$^2$, the area of the wall contacting with the exhaust gases inside the porous honeycomb units becomes small. When the number is more than about 186 cells/cm$^2$, on the other hand, the pressure loss becomes large and also manufacturing of the porous honeycomb units becomes difficult.

The shape of through-holes formed in the porous honeycomb units, although not particularly restricted, may have a cross-section of substantially triangle or substantially hexagon. In such a case, the strength of the porous honeycomb units can be increased, as the strength (for example, the isostatic strength etc.) of the honeycomb structure can be increased without increasing the pressure loss and degrading the performance such as the conversion of exhaust gas. Examples of porous honeycomb units 11 are shown in FIG. 2: in FIG. 2(a) the cross-section of the through-hole 12 is made triangular, and the through-holes 12 having a triangular cross-section are alternatively arranged in up and down orientations; FIG. 2(b), edges of 4 through-holes 12 having a triangular cross section are faced each other forming a square structure; and in FIG. 2(c), the honeycomb unit is formed with the through-holes 12 having a hexagonal cross-section. As shown above, the through-holes 12 may be formed in the porous honeycomb units 11.

The size of the cross-sectional area of the porous honeycomb units composing the honeycomb structure is preferably about 5 to about 50 cm$^2$, more preferably about 6 to about 40 cm$^2$, most preferably about 8 to about 30 cm$^2$. When the cross-sectional area is in the range from about 5 to about 50 cm$^2$, the ratio of the cross-sectional area of the sealing material layer to the cross-sectional area of the honeycomb structure can be adjusted. In such a case, not only the specific surface area per unit volume of the honeycomb structure can be kept large and also catalyst components can be highly dispersed. Thus, it is possible to keep the shape as a honeycomb structure even if the thermal shock or the external force such as vibration is exerted. Furthermore, the cross-sectional area is preferably about 5 cm$^2$ or more, because the pressure loss becomes small. The specific surface area per unit volume can be obtained according to formula (1) described below.

Description now regards an example of a manufacturing method of the honeycomb structure of the present invention described above. The method first extrusion mold raw material paste which mainly includes an inorganic material of the first form, an inorganic material of the second form, and an inorganic binder, as described above, to prepare a honeycomb unit molding. An organic binder, a dispersant, and a molding auxiliary agent may be appropriately added in accordance with the moldability, for the raw material paste. The organic binder, although not specifically restricted, may be, for example, one or multiple kinds of organic binders selected from methyl cellulose, carboxymethyl cellulose, hydroxyethyl cellulose, polyethyleneglycol phenol resins, and epoxy resins. The compounding ratio of the organic binder is preferably about 1 to about 10 parts by weight for 100 parts by weight of the sum of the inorganic material of the first form the inorganic material and the inorganic binder of the second form. The dispersant, although not specifically restricted, may be, for example, water, organic solvents (benzene etc.), and alcohols (methanol etc.). The molding auxiliary agent, although not specifically restricted, may be, for example, ethylene glycol, dextrin, fatty acid soap, and polyalcohol.

The raw materials paste, although not specifically restricted, is preferably mixed and kneaded. The raw material may be mixed with, for example, mixer, attritor, etc., and may also be sufficiently kneaded with kneader etc. The raw material paste, although not specifically restricted, is preferably molded in a shape having through-holes by extrusion molding etc.

After that, the obtained molding is preferably to be dried. Dryers used for drying, although not specifically restricted, may be a microwave dryer, a hot-air dryer, an dielectric heating dryer, a reduced pressure dryer, a vacuum dryer, a freeze dryer. In addition, the obtained molding is preferably to be defatted. The condition for defatting, although not specifically restricted, is appropriately varied according to the kinds and amounts of organic materials included in the molding, and is preferably about 400° C. and 2 hours. Furthermore, the obtained molding is preferably to be sintered. The sintering condition, although not specifically restricted, is preferably about 600 to about 1,200° C., more preferably about 600 to about 1,000° C. When the sintering temperature is lower than about 600° C., sintering of ceramic particles etc. does not propagate and the strength as a honeycomb structure decreases. When the sintering temperature is higher than about 1,200° C., on the other hand, sintering of ceramic particles etc. propagates excessively and the specific surface area per unit volume becomes small. Thus, supported catalyst components can not be highly and sufficiently dispersed. Through the process described above, porous honeycomb units having multiple through-holes can be obtained.

Next, the method applys sealing material paste to form the sealing material layer, to the obtained porous honeycomb unit, and joint porous honeycomb units successively. After that, the method dries and fixes the jointed porous honeycomb units to give a jointed body of honeycomb units with a predetermined size may be manufactured. The sealing material, although not specifically restricted, may be, for example, mixtures of inorganic binders and ceramic particles, mixtures of inorganic binders and inorganic fibers, mixtures of inorganic binders, ceramic particles and inorganic fibers etc. Organic binders may be added to the sealing material. The organic binders, although not specifically restricted, may be one or multiple kinds of organic binders selected from polyvinyl alcohol, methyl cellulose, ethyl cellulose, carboxymethyl cellulose, etc. are included.

The thickness of the sealing material layer jointing porous honeycomb units is preferably about 0.5 to about 2 mm. When the thickness is less than about 0.5 mm, the sufficient joint strength may not be obtained. When the thickness is more than about 2 mm, since the sealing material layer does not work as the catalyst carrier, the specific surface area per unit volume of the honeycomb structure decreases and supported catalyst components can not be highly and sufficiently dispersed. In addition, the pressure loss may become large when the thickness of the sealing material layer is more than about 2 mm. The number of jointed porous honeycomb units may be appropriately determined according to the size of honeycomb structure used as a honeycomb catalyst. The jointed porous honeycomb units with the sealing material may be appropriately cut and polished according to the shape and size of the honeycomb structure.

The method may further apply, dry and fix a coating material on the outer periphery surface (side surface) where through-holes of the honeycomb structure are not open, to form a coating material layer. The outer periphery surface can thus be protected and the strength of the honeycomb structure can be increased. The coating material, although not specifically restricted, may be the same material as the sealing material or different material. The coating material may have the same compounding ratio as that of the sealing material or a different compounding ratio. The thickness of the coating material layer, although not specifically restricted, is preferably about 0.1 to about 2 mm. When the thickness is less than about 0.1 mm, the outer periphery surface may not be sufficiently protected and the strength of the honeycomb structure may not be increased. On the other hand, when the thickness is more than about 2 mm, the specific surface area per unit volume of the honeycomb structure decreases and supported catalyst components can not be highly and sufficiently dispersed.

After multiple porous honeycomb units are jointed with a sealing material (Note: after the coating material layer is formed, in case that a coating material layer is provided), they are preferably to be calcined. When organic binders are included in the sealing material or the coating material, the organic binders can be defatted and removed through calcining. The calcining condition, which may be appropriately determined according to the kind and amount of included organic materials, is preferably about 700° C. and 2 hours. The honeycomb structure thus obtained through calcination is, during usage, free from blowoff of contaminated exhaust gases generated by burning of organic binders remained in the honeycomb structure. FIG. 1(b) schematically illustrates an example of a cylindrically-shaped honeycomb structure 10, which is obtained by jointing multiple cuboid porous honeycomb units 11 having a square cross-section. The honeycomb structure 10 is obtained by jointing the porous honeycomb units 11 with the sealing material layer 14, cutting into a cylindrical shape and covering the outer periphery surface where the through-holes 12 of the honeycomb structure 10 are not open (side surface) with the coating material layer 16. In case that, for example, honeycomb units 11 are molded and jointed to have a fan-shape cross-section or square cross-section so as to give a predetermined shape (cylindrical in FIG. 1(b)) of the honeycomb structure, the cutting and polishing steps above may be omitted.

The obtained honeycomb structure may be used, although not specifically restricted, preferably for a catalyst carrier of automobile exhaust gas conversion. When used as a catalyst carrier for exhaust gas conversion of a diesel engine, it may be used together with a diesel particulate filter (DPF) having a ceramic honeycomb structure made of silicon carbide etc. and having the function of filtering particulate matter (PM) in exhaust gases by burning purification. In such a case, as for the arrangement of the honeycomb structure of the present invention and DPF, the honeycomb structure of the present invention may be placed either in the front side or in the rear side of DPF. When the honeycomb structure of the present invention, placed in the front side, in the case that the honeycomb structure of the present invention shows an exothermic reaction, the generated heat is transmitted to DPF in the rear side and can promote warmup for recovering of DPF. On the other hand, when placed in the rear side, since PM in exhaust gas is filtered by DPF and passes through the through-holes in the honeycomb structure of the present invention, it hardly causes clogging, and furthermore, even if gases are generated by incomplete combustion of PM in DPF, the honeycomb structure of the present invention can treat the gas components. This honeycomb structure can be used without restriction not only for applications etc. described in the above background art, but also for applications used without supporting catalyst components (for example, adsorbents etc. adsorbing gas components and liquid components).

Also, the obtained honeycomb structure may be used as a honeycomb catalyst by means of supporting catalyst components. The catalyst components, although not specifically restricted, may be noble metals, compounds of alkaline metals, compounds of alkaline-earth metals, oxides, etc. As noble metals, a kind or 2 kinds or more of metals selected from the group consisting of, for example, platinum, palladium, and rhodium are included. As compounds of alkaline metals, a kind or 2 kinds or more of compounds selected from the group consisting of, for example, potassium, sodium, etc. are included, and as compounds of alkaline-earth metals, for example, barium compounds are included. As oxides, perovskites ($La_{0.75}K_{0.25}MnO_3$ etc.), $CeO_2$, etc. are included. The obtained honeycomb catalyst, although not specifically restricted, may be used as, for example, so-called ternary catalyst and NOx occlusion catalyst for exhaust gas conversion of automobiles. In addition, supporting of catalyst components, although not specifically restricted, may be performed after manufacturing of the honeycomb structure or at the stage of raw materials of ceramic particles. The supporting method of catalyst components, although not specifically restricted, may be performed by, for example, impregnation etc.

BRIEF DESCRIPTION OF THE DRAWINGS

FIG. 1 schematically illustrates a porous honeycomb unit 11 and a honeycomb structure 10 of the present invention;

FIG. 2 illustrates through-holes 12 formed in the porous honeycomb unit 11;

FIG. 4 is a table showing preparation conditions in Examples 1 to 29,

FIG. 5 is a table showing preparation conditions in Examples 1, and 30 to 43;

FIG. 6 is a table showing preparation conditions in Examples 44 to 51;

FIG. 7 illustrates Examples in which multiple porous honeycomb units 11 are jointed each other;

FIG. 8 illustrates Examples in which multiple porous honeycomb units 11 are jointed each other;

FIG. 11 is a table showing measurement results of Examples 1 to 29 and Examples 44 to 47;

FIG. 14 is a table showing measurement results of Examples 1 and 30 to 34;

FIG. 16 is a table showing measurement results of Examples 35 to 43;

FIG. 18 is a table showing measurement results of Examples 48 to 51.

EXAMPLES

Hereinafter, the some modes for carrying out the present invention are described as preferred examples.

The following describes examples prepared in various conditions, but the present invention is not limited thereto.

Example 1

The procedure mixed 40% weight of γ-alumina particles (the averaged particle diameter of 2 μm), 10% by weight of silica-alumina fibers (averaged fiber diameter of 10 μm, averaged fiber length of 100 μm, and aspect ratio of 10), and 50% by weight of silica sol (solid concentration of 30% by weight). The process added 6 parts by weight of methyl cellulose as an organic binder, small amounts of a plasticizer and a lubricant to 100 parts by weight of the obtained mixture, then mixed and kneaded the whole mixed composition. The mixed composition was extrusion molded by an extruder to a raw molded object.

Figure 3:
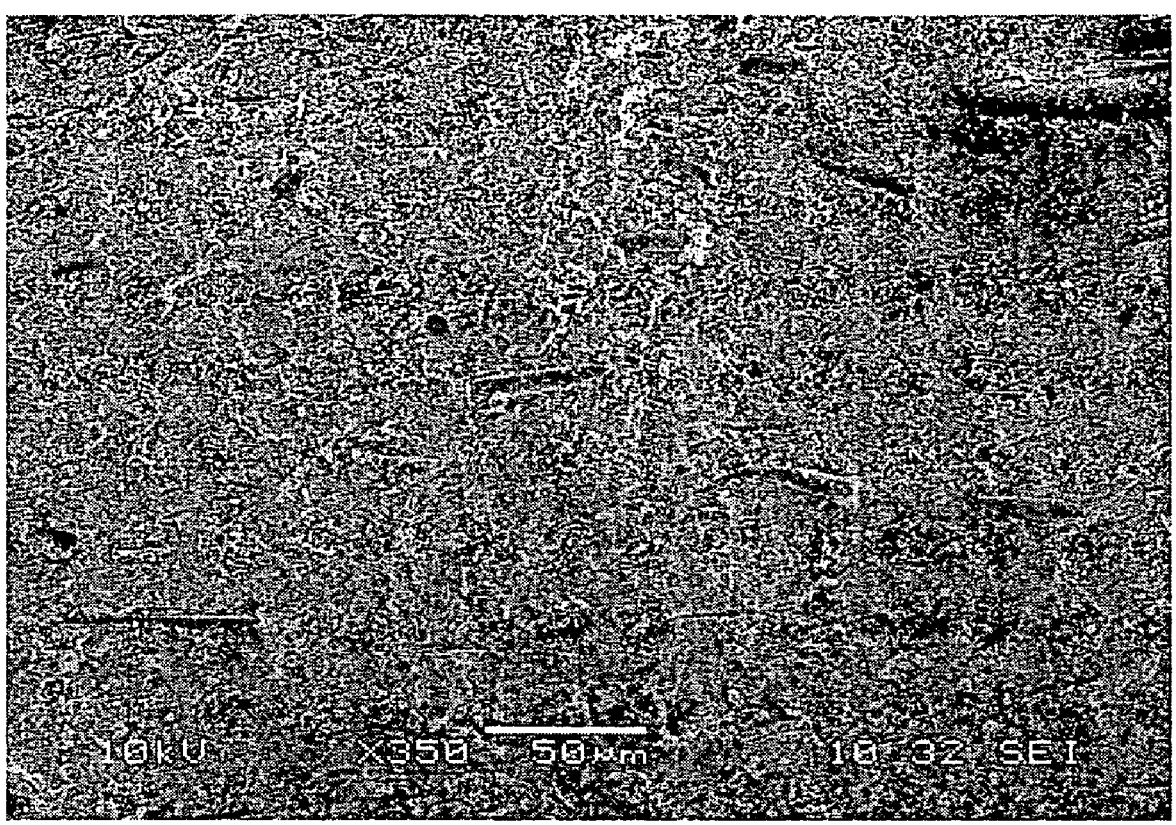
FIG. 3 is a SEM photograph of a wall in the porous honeycomb unit 11.

The raw molded object was sufficiently dried with a microwave dryer and a hot-air dryer, and kept at 400° C. for 2 hours for degreasing. The degreased molded object was sintered at 800° C. for 2 hours to give a porous honeycomb unit 11 of a square pillar (34.3 mm×34.3 mm×150 mm), which has cell density of 93 cells/cm$^2$ (600 cpsi), wall thickness of 0.2 mm, and cell shape of quadrangle (square). A scanning electron microscope (SEM) photograph of the wall in the porous honeycomb units 11 is shown in FIG. 3. The photograph shows that the silica-alumina fibers are oriented along the extruded direction of the raw material paste.

Next, the process mixed 29% weight of γ-alumina particles (averaged particle diameter of 2 μm), 7% by weight of silica-alumina fibers (averaged fiber diameter of 10 μm and averaged fiber length of 100 μm), 34% by weight of silica sol (solid concentration of 30% by weight), 5% by weight of carboxymethyl cellulose, and 25% by weight of water to obtain a heat-resisting sealing material paste. The porous honeycomb units 11 were jointed via the obtained sealing material paste. FIG. 7(a) shows a jointed object of multiple porous honeycomb units 11 seen from the surface having through-holes (hereinafter referred to as the front surface). The sealing material paste with the thickness of 1 mm was applied on the outer surfaces 13 of the porous honeycomb units 11 described above, and then multiple porous honeycomb units 11 were jointed each other and fixed. The jointed object thus obtained was cut with a diamond cutter into a cylindrical shape so that its front surface becomes substantially symmetrical around a point, and then the outer surface of the jointed object, where through-holes did not appear, was coated by the sealing material paste described above in the thickness of 0.5 mm. Then, it was dried at 120° C., and the sealing material layer and coating material layer were defatted at 700° C. for 2 hours, to form a cylindrical honeycomb structure 10 (diameter of 143.8 mm and length of 150 mm). Specifications of the cylindrical honeycomb structure 10 including the ceramic particle component, unit shape, unit cross section, unit area ratio (the ratio of the total cross-sectional area of the porous honeycomb units to the cross-sectional area of the honeycomb structure, and hereinafter, referred to as unit area ratio), sealing material layer area ratio (the ratio of the total cross-sectional area of the sealing material layer and the coating material layer to the cross-sectional area of the honeycomb structure, and hereinafter, referred to as sealing material layer area ratio) of this honeycomb structure 10 are shown in the table of FIG. 4.

The specifications of Examples 2 to 29 described below are also shown in FIG. 4. In all the samples shown in the table of FIG. 4, the inorganic material of the second form is the silica-alumina fibers (averaged fiber diameter of 10 μm, averaged fiber length of 100 μm, and aspect ratio of 10), and the inorganic binder is the silica sol (solid concentration of 30% by weight). The specifications of Examples 30 to 43 including the inorganic material of the second form (kind, diameter, length, aspect ratio, and particle diameter), unit shape, and unit cross sectional area are shown in the table of FIG. 5. In all the samples shown in the table of FIG. 5, the inorganic material of the first form is the γ-alumina particles, the inorganic binder is the silica sol (solid concentration of 30% by weight), the unit area ratio is 93.5%, and the sealing material layer area ratio is 6.5%. In addition, the specifications of Examples 44 to 51 including the kind of the inorganic binder, unit cross-sectional area, thickness of the sealing material layer, unit area ratio, sealing material layer area ratio, and the sintering temperature of the porous honeycomb units of the honeycomb structure 10 are shown in the table of FIG. 6. In all the samples shown in the table of FIG. 6, the inorganic material of the first form is the γ-alumina particles (averaged particle diameter of 2 μm), and the inorganic material of the second form is the silica-alumina fibers (averaged fiber diameter of 10 μm, averaged fiber length of 100 μm, and aspect ratio of 10).

Examples 2 to 7

Honeycomb structures 10 were prepared in the same manner as Example 1, except that the porous honecomb units were designed to have the shape shown in the table of FIG. 4, The shapes of the jointed object of Examples 2, 3, and 4 are respectively illustrated in FIGS. 7(*b*), (*c*), and (*d*), and the shapes of the jointed object of Examples 5, 6, and 7 are respectively illustrated in FIGS. 8(*a*), (*b*), and (*c*). In Example 7, since the honeycomb structure 10 was molded as an integral body, the jointing process and cutting process were not performed.

Examples 8 to 14

Porous honeycomb units 11 were prepared in the same manner as Example 1, except that titania particles (averaged particle diameter of 2 μm) were used as the ceramic particle of the inorganic material of the first form and that the porous honeycomb units were designed to have the shape shown in the table of FIG. 4. Subsequently, honeycomb structures 10 were prepared in the same manner as Example 1, except that titania particles (averaged particle diameter of 2 μm) were used as the ceramic particles of the sealing material layer and the coating material layer. Note that the shapes of the jointed objects of Examples 8 to 11 are respectively the same as those shown in FIGS. 7(*a*) to (*d*), and the shapes of the jointed objects of Examples 12 to 14 are respectively the same as those shown in FIGS. 8(*a*) to (*c*). The honeycomb structure of Example 14 was molded as an integral body.

Examples 15 to 21

Porous honeycomb units 11 were prepared in the same manner as Example 1, except that silica particles (averaged particle diameter of 2 μm) were used as the ceramic particles of the inorganic material of the first form and that the porous honeycomb units were designed to have the shape shown in the table of FIG. 4. Subsequently, honeycomb structures 10 were prepared in the same manner as Example 1, except that silica particles (averaged particle diameter of 2 μm) were used as the ceramic particles of the sealing material layer and the coating material layer. The shapes of the jointed objects of Examples 15 to 18 are respectively the same as those shown in FIGS. 7(*a*) to (*d*), and the shapes of the jointed objects of Examples 19 to 21 are respectively the same as those shown in FIGS. 8(*a*) to (*c*). The honeycomb structure of Example 21 was molded as an integral body.

Examples 22 to 28

Porous honeycomb units 11 were prepared in the same manner as Example 1, except that zirconia particles (averaged particle diameter of 2 μm) were used as the ceramic particles of the inorganic material of the first form and that the porous honeycomb units were designed to have the shape shown in the table of FIG. 4. Subsequently, honeycomb structures 10 were prepared in the same manner as Example 1, except that zirconia particles (averaged particle diameter of 2 μm) were used as the ceramic particles of the sealing material layer and the coating material layer. The shapes of the jointed objects of Examples 22 to 25 are respectively the same as those shown in FIGS. 7(*a*) to (*d*), and the shapes of the jointed objects of Examples 26 to 28 are respectively the same as those shown in FIGS. 8(*a*) to (*c*). The honeycomb structure of Example 28 was molded as an integral body.

Example 29

A commercially available cylindrical cordierite honeycomb structure (diameter of 143.8 mm and length of 150 mm) was used as a honeycomb structure 10 of Example 29, in which the alumina layer as a catalyst supporting layer was formed inside the through-holes. The cell shape was hexagonal, the cell density was 62 cells/cm$^2$ (400 cpsi), and the wall thickness was 0.18 mm. The shape of the honeycomb structure seen from the front surface was the same as that shown in FIG. 8(*c*).

Examples 30 to 34

Porous honeycomb units 11 were prepared in the same manner as Example 1, except that silica-alumina fibers having the shape shown in the table of FIG. 5 were used as the inorganic material of the second form. Subsequently, honeycomb structures 10 were prepared in the same manner as Example 1, except that silica-alumina fibers, that were used for the porous honeycomb units, were also used as the silica-alumina fibers of the sealing material layer and the coating material layer. The shapes of the jointed objects of Examples 30 to 34 are the same as that shown in FIG. 7(*a*).

Example 35

Honeycomb unit 11 was prepared in the same manner as Example 1, except that γ-alumina particles (averaged particle diameter of 2 μm) were used as the inorganic materials of the first and second forms, as shown in the table of FIG. 5. Subsequently, honeycomb structure 10 was prepared in the same manner as Example 1, except that γ-alumina particles (averaged particle diameter of 2 μm) were used as the ceramic particles as inorganic materials of the first and second forms of the sealing material layer and the coating material layer. The shape of the jointed object of Examples 35 is the same as that shown in FIG. 7(*a*).

Examples 36 to 43

Porous honeycomb units 11 were prepared in the same manner as Example 1, except that α-alumina particles were used as the inorganic material of the second form, shown in the table of FIG. 5. Subsequently, honeycomb structures 10 were prepared in the same manner as Example 1, except that α-alumina particles, that were used for the porous honeycomb units, were also used as the inorganic material of the second form of the sealing material layer and the coating material layer. The shapes of the jointed objects of Examples 36 to 43 are the same as that shown in FIG. 7(a).

Examples 44 to 47

Honeycomb structures 10 were prepared in the same manner as Example 1, except that, except that the cross-sectional area of the porous honeycomb units and the thickness of the sealing material layer jointing the porous honeycomb units were changed, as shown in the table of FIG. 6. The shapes of the jointed objects of Examples 44 and 45 are the same as that shown in FIG. 7(a), and the shapes of the jointed objects of Examples 46 and 47 are the same as that shown in FIG. 7(c).

Example 48

A honeycomb structure 10 was prepared in the same manner as Example 1, except that alumina sol (solid concentration of 30% by weight) was used as the inorganic binder to obtain porous honeycomb units, as shown in the table of FIG. 6.

Examples 49 and 50

Honeycomb structures 10 were prepared in the same manner as Example 1, except that sepiolite or attapulgite were used as the inorganic binder to obtain porous honeycomb units, as shown in the table of FIG. 6. Specifically, the process mixed 40% weight of γ-alumina particles (averaged particle diameter of 2 μm), 10% by weight of silica-alumina fibers (averaged fiber diameter of 10 μm, averaged fiber length of 100 μm, and aspect ratio of 10), 15% by weight of the inorganic binder, and 35% by weight of water to obtain a mixture. The process subsequently added an organic binder, a plasticizer and a lubricant to the obtained mixture, and molded and sintered the mixed composition to give a porous honeycomb unit 11. Next, multiple porous honeycomb units 11 were jointed with the same sealing material paste as that of Example 1. Subsequently, the jointed object thus obtained was cut and a coating material layer 16 was formed to give a cylindrical honeycomb structures 10 (diameter of 143.8 mm and length of 150 mm).

Example 51

A honeycomb structure 10 was prepared in the same manner as Example 1, except that the porous honeycomb units were designed without mixing an inorganic binder, as shown in the table of FIG. 6. Specifically, the process mixes 50% weight of γ-alumina particles (averaged particle diameter of 2 μm), 15% by weight of silica-alumina fibers (averaged fiber diameter of 10 μm, averaged fiber length of 100 μm, and aspect ratio of 10), and 35% by weight of water, to obtain a mixture. The process subsequently added an organic binder, a plasticizer and a lubricant, to the mixture as in Example 1. The mixture composition was molded and sintered at 1000° C. to obtain a porous honeycomb unit 11. Then, multiple porous honeycomb units 11 thus obtained were jointed with the same sealing material paste as that of Example 1. The jointed object was cut and a coating material layer 16 was formed, to give a cylindrical honeycomb structure 10 (diameter of 143.8 mm and length of 150 mm).

Measurement of Specific Surface Areas

The specific surface areas of porous honeycomb units 11 of Examples 1 to 51 were measured. First, the volumes of the porous honeycomb units 11 and sealing materials were measured, and the ratio A (% by volume) of the unit materials to the volume of the honeycomb structure was calculated. Next, the BET specific surface area B ($m^2/g$) of the unit weight of the porous honeycomb unit 11 was measured. The BET specific surface area was measured with a BET measuring apparatus (Micromeritics FlowSorb II-2300, manufactured by Shimadzu Corporation) by one-point method according to JIS-R-1626 (1996) prescribed in Japan Industrial Standard. The contents of JIS-R-1626 (1996) are incorporated herein by reference in their entity. Measured samples were small pieces cut cylindrically (diameter of 15 mm and length of 15 mm). In addition, apparent densities C (g/L) of the porous honeycomb units 11 were calculated by using the weights and outer volumes of the porous honeycomb units 11, and specific surface areas S ($m^2/L$) of the honeycomb structures were determined according to the following formula (1). Here, the specific surface area of a honeycomb structure refers to the specific surface area per apparent volume of the honeycomb structure.

$$S(m^2/L)=(A/100) \times B \times C; \quad \text{formula (1)}$$

Repeated Thermal Shock and Vibration Tests

Figure 9:
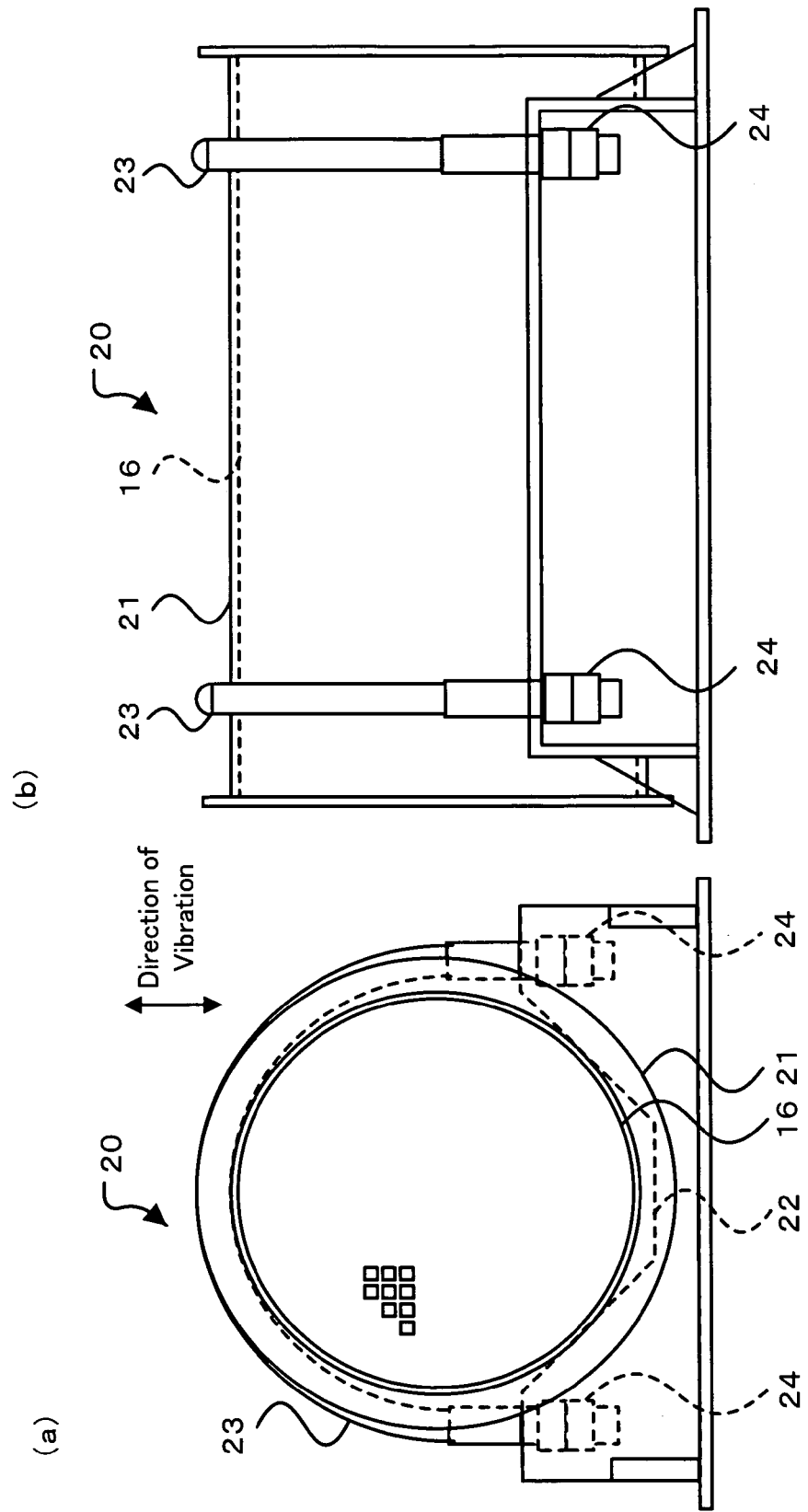
FIG. 9 shows an example of a vibration device 20.

Repeated thermal shock and vibration tests of honeycomb structures of Examples 1 to 51 were performed. In the thermal shock test, a honeycomb structure was wrapped with a heat insulator made of alumina fiber, a alumina mat (Maftec, 46.5 cm×15 cm, thickness of 6 mm, manufactured by Mitsubishi Chemical Corporation) on its outer periphery and put in a metal casing 21, then placed into a baking oven set at 600° C., heated for 10 minutes, and then taken out of the oven and quenched to room temperature. Next, the honeycomb structure, as placed in the metal casing, was subjected to the vibration test. A front view of a vibrating device 20 used for the vibration test is shown in FIG. 9(a), and a side view of the vibrating device 20 is shown in FIG. 9(b). The metal casing 21 containing the honeycomb structure was put on a pedestal 22, and fixed by using a roughly U-shaped holding fixture 23 and tightened with screws 24. Thus, the metal casing 21 could be vibrated together with the pedestal 22 and the holding fixture 23 integrally. The vibration test was performed under the following conditions: frequency of 160 Hz, acceleration of 30 G, vibration amplitude of 0.58 mm, holding time of 10 hours, room temperature, and vibration direction of the Z direction (up and down). After the thermal shock test and the vibration test were alternatively repeated 10 times, respectively, the weight T0 of the honeycomb structure before testing and the weight Ti after testing were measured, and the weight reduction ratio G was determined according to the following formula (2):

$$G(\text{\% by weight})=100 \times (T0-Ti)/T0; \quad \text{formula (2)}$$

Measurement of Pressure Loss

Figure 10:
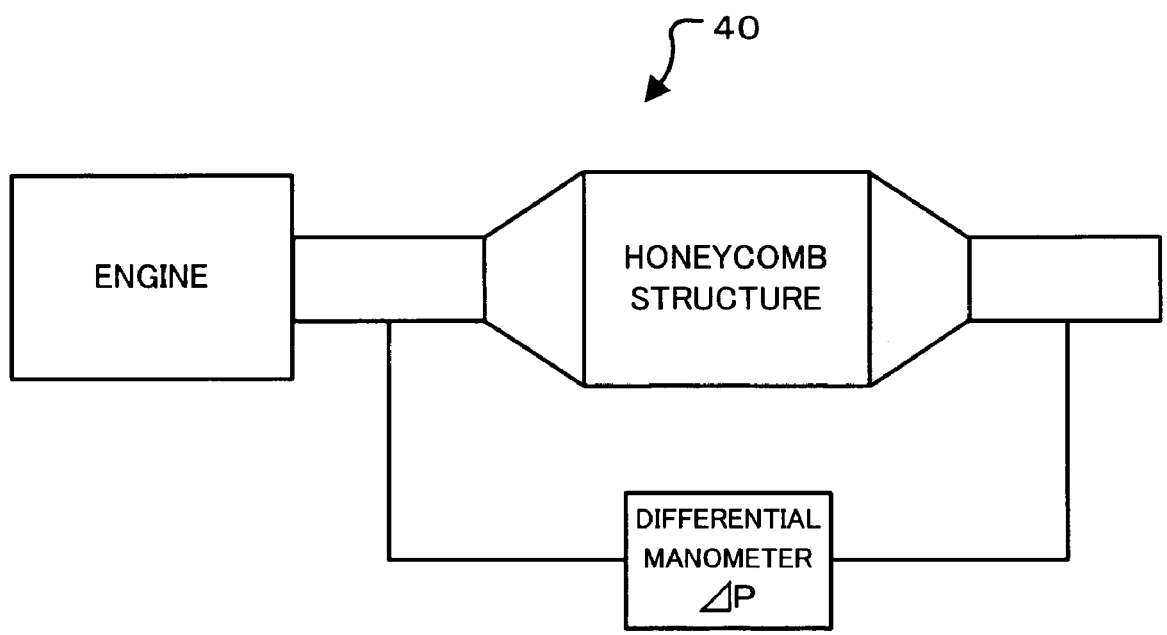
FIG. 10 shows an example of a pressure loss measuring device 40.

The pressure loss of the honeycomb structure of Examples 1 to 51 was measured. A pressure loss measuring apparatus 40 is shown in FIG. 10. The measurement was performed by placing the honeycomb structure wrapped with an alumina mat put into a metal casing connected to an exhaust pipe of a 2 L common-rail type diesel engine. Pressure gages were connected to the upstream and downstream sides of the honeycomb structure. As the measuring conditions, the number of engine revolution was set to 1,500 rpm and the torque was set to 50 Nm, and the pressure difference was measured 5 minutes after the start of operation.

Results of Measurements

Figure 12:
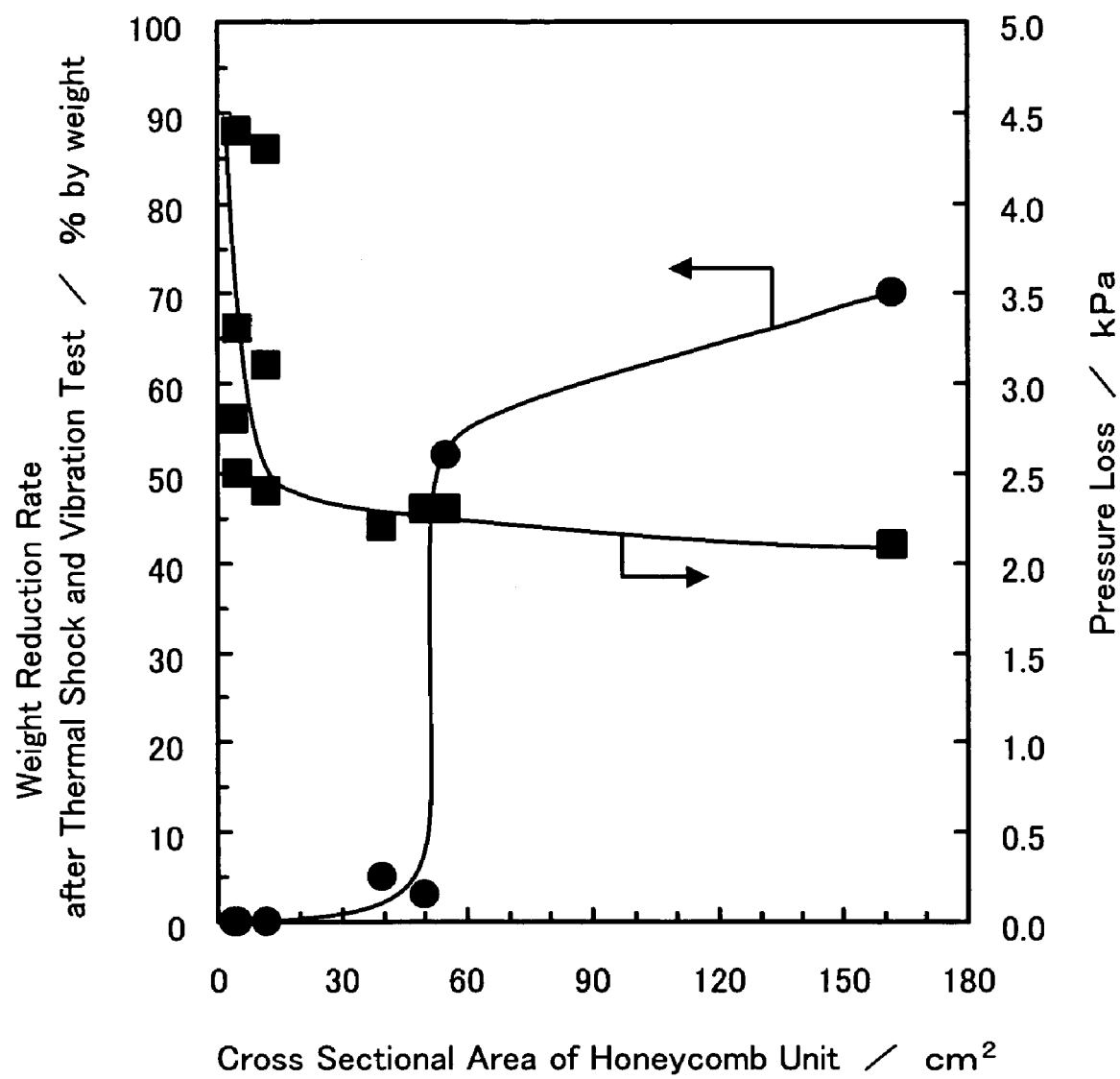
FIG. 12 is a graph showing variations in the weight reduction rate and the pressure loss against cross-sectional area of the honeycomb unit.
Figure 13:
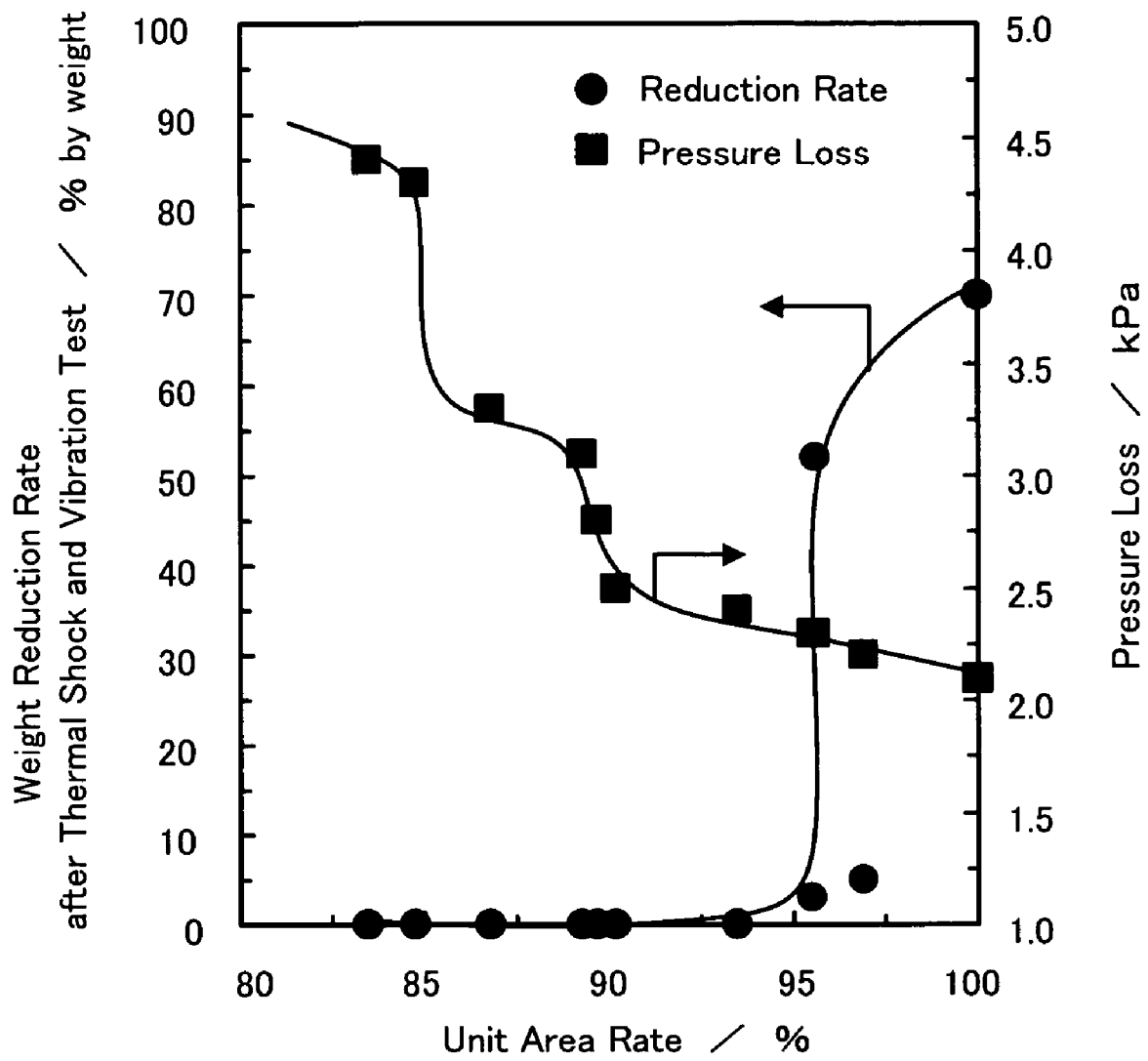
FIG. 13 is a graph showing variations in the weight reduction rate or the pressure loss against the unit area rate.

Various values and the like regarding ceramic particle components, unit cross-sectional areas, unit area ratios, specific surface areas of porous honeycomb units, specific surface areas S of honeycomb structures, weight reduction ratios G after repeated thermal shock and vibration tests, and pressure losses of Examples 1 to 29 and Examples 44 to 47 are summarized and shown in the table of FIG. 11. FIG. 12 shows a graph of the measured weight reduction rate G after repeated thermal shock and vibration tests and the pressure loss in the Y-axis as a function of the cross-sectional area of porous honeycomb units in the X-axis, and FIG. 13 shows the weight reduction rate G after repeated thermal shock and vibration tests and the pressure loss in the Y-axis as a function of the unit area rate in the X-axis. From these measurement results of Examples 1 to 29 and Examples 44 to 47 shown in FIG. 11 and FIG. 12, it was found clearly that, if ceramic particles, inorganic fibers, and inorganic binders were main components and if the cross-sectional area of porous honeycomb units 11 was in the range from 5 to 50 cm$^2$, the honeycomb structures could have large specific surface areas per unit volume and sufficient strength against thermal shock and vibration. Also, as shown in FIG. 13, it was found that, if ceramic particles, inorganic fibers, inorganic binders were main components, if the cross-sectional area of porous honeycomb units 11 was in the range of 50 cm$^2$ or less, and if the unit area ratio was 85% or more, the honeycomb structures could have large specific surface areas per unit volume and sufficient strength against thermal shock and vibration, and lower pressure losses. Especially, when the unit area ratio was 90% or more, the reduction of pressure loss was significant.

Figure 15:
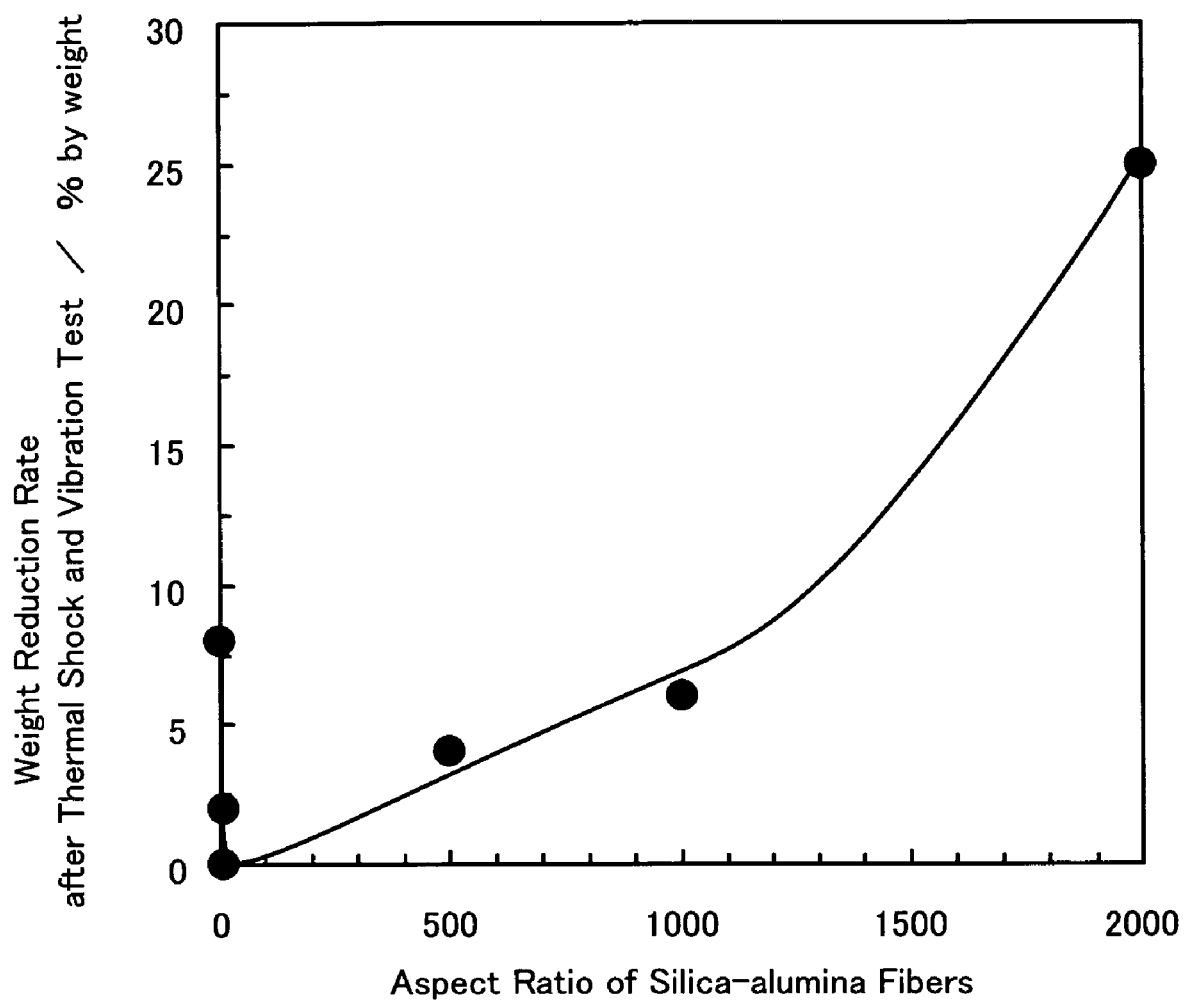
FIG. 15 is a graph showing variation in the weight reduction rate against the aspect ratio of silica-alumina fibers.

Next, as for Examples 1, and 30 to 34 in which aspect ratios of inorganic fibers were varied, various values and the like regarding diameters, lengths, aspect ratios of silica-alumina fibers, specific surface areas of porous honeycomb units 11, specific surface areas S of the honeycomb structures, weight reduction ratios G after repeated thermal shock and vibration tests, and pressure losses are summarized and shown in the table of FIG. 14, and FIG. 15 shows a graph of the weight reduction rate G after repeated thermal shock and vibration tests in the Y-axis as a function of the aspect ratio of silica-alumina fibers in X-axis. From these results, it was found that, when the aspect ratio of inorganic fibers was in the range from 2 to 1000, the honeycomb structures could have sufficient strength against thermal shock and vibration.

Figure 17:
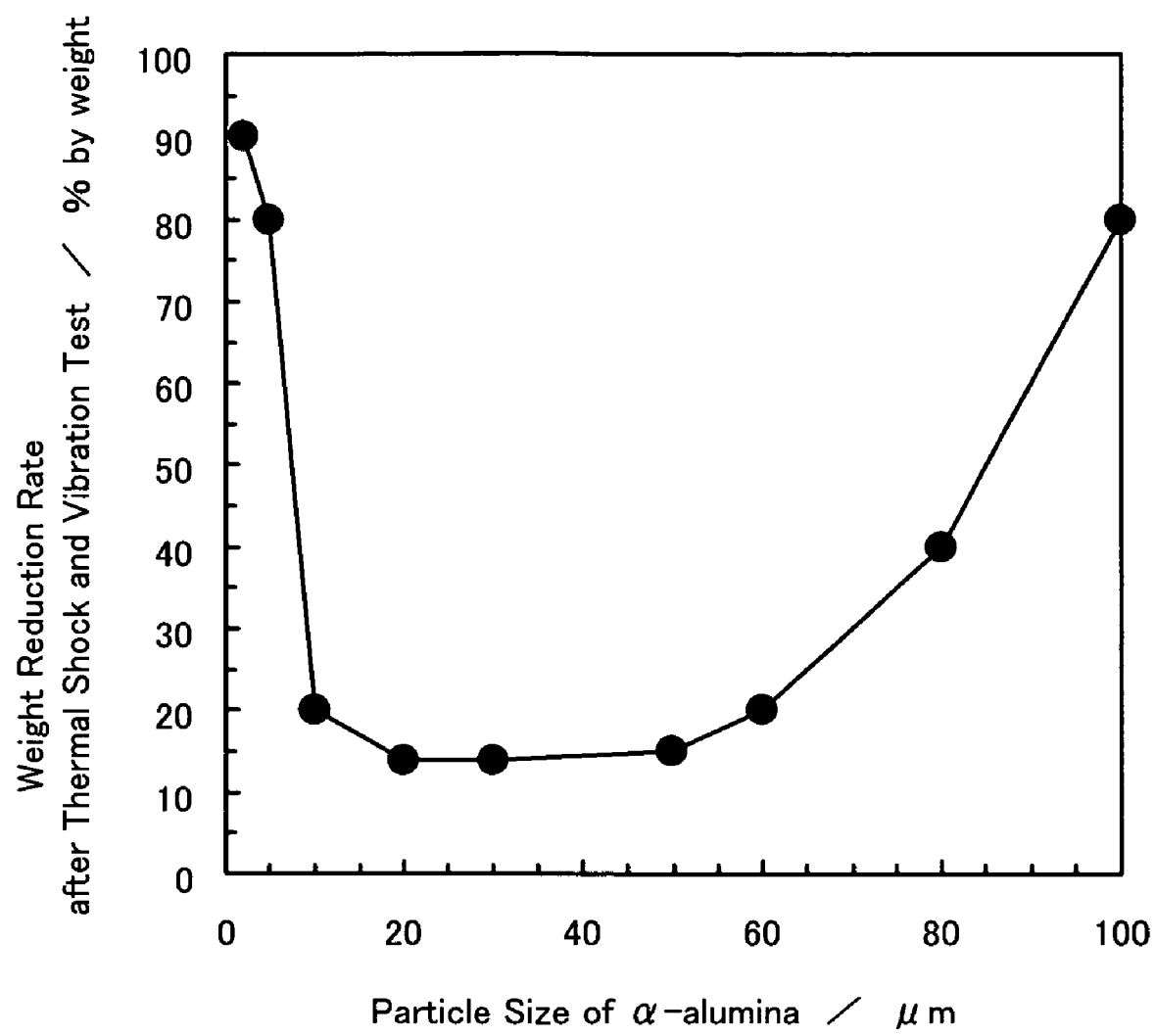
FIG. 17 is a graph showing variation in the weight reduction rate against the particle size of a-alumina.

In addition, as for Examples 35 to 43 in which particle sizes of ceramic particles as the inorganic material of the second form were varied, various values and the like regarding particle sizes of α-alumina as the inorganic material of the second form, shapes and specific surface areas of porous honeycomb units 11, specific surface areas S of honeycomb structures, weight reduction ratios G after repeated thermal shock and vibration tests, and pressure losses are summarized and shown in the table of FIG. 16, and FIG. 17 shows a graph of the weight reduction rate G after repeated thermal shock and vibration tests in the Y-axis as a function of the particle size of α-alumina as the inorganic material of the second form in the X-axis. From these results, it was found that, when the particle size of ceramic particles as the inorganic material of the second form was in the range from 10 to 60 μm, the honeycomb structures could have sufficient strength against thermal shock and vibration. Furthermore, when the particle size of ceramic particles as the inorganic material of the second form was 5 times or more of the particle size of ceramic particles as the first form of the inorganic material, the honeycomb structures could have sufficient strength against thermal shock and vibration.

Then, as for Examples 48 to 50 in which porous honeycomb units 11 were fabricated by varying kinds of inorganic binders and as for Example 51 in which a porous honeycomb unit 11 was fabricated without mixing an inorganic binder, various values and the like regarding kinds of inorganic binders, sintering temperatures of porous honeycomb units 11, unit area ratios, specific surface areas of porous honeycomb units 11, specific surface areas S of honeycomb structures, weight reduction ratios G after repeated thermal shock and vibration tests, and pressure losses are summarized and shown in the table of FIG. 18. From these results, it was found that, when an inorganic binder was not mixed, sufficient strength could be obtained by sintering at relatively high temperature. On the other hand, it was found that when an inorganic binder is mixed, even if sintered at relatively low temperature, sufficient strength could be obtained. Also, it was found that, when alumina sol or clay-type binders were used as inorganic binders, the honeycomb structures 10 could have large specific surface areas per unit volume and sufficient strength against thermal shock and vibration.

Honeycomb Catalyst

The procedure impregnated honeycomb structures 10 of Examples 1 to 43 in a platinum nitrate solution, supported the catalyst component to have the weight of platinum per unit volume of the honeycomb structure 10 to become 2 g/L, and held the honeycomb structures at 600° C. for 1 hour, to obtain honeycomb catalyst.

This application claims benefit of priority to Japanese Patent Application No. 2003-435368 filed on Dec. 26, 2003, Japanese Patent Application No. 2004-141282 filed on May 11, 2004, and Japanese Patent Application No. 2004-214729 filed on Jul. 22, 2004, the contents of those are incorporated herein by reference in their entity.

What is claimed is:

1. A honeycomb structure inside which a fluid can flow, said honeycomb structure comprising:
   porous honeycomb units that 1) have multiple through-holes, and 2) include at least an inorganic material of a first form comprising ceramic particles and an inorganic material of a second form comprising inorganic fibers included in a body of and existing on outer longitudinally extending surfaces of the porous honeycomb units;
   at least one of the porous honeycomb units having, perpendicular to the through-holes, a cross-sectional area of about 5 to about 50 cm$^2$; and
   sealing material layers jointing two or more of the porous honeycomb units to each other along the outer longitudinally extending surfaces of the porous honeycomb units where the through-holes are not open,
   wherein a specific surface area for the porous honeycomb units is in a range from 25,000 m$^2$/L to 42,000 m$^2$/L.

2. The honeycomb structure according to claim 1, wherein the ratio of the total cross-sectional area of the porous honeycomb units to cross-sectional area of the honeycomb structure is not less than about 85%.

3. The honeycomb structure according to claim 1, wherein the ratio of the total cross-sectional area of the porous honeycomb units to cross-sectional area of the honeycomb structure is not less than about 90%.

4. The honeycomb structure according to claim 1, comprising a coating material layer covering said outer surfaces, where the through-holes are not open, of two or more of the porous honeycomb units jointed to each other with the sealing material layers.

5. The honeycomb structure according to claim 1, wherein the inorganic material of the second form has a function as a reinforcing material for the porous honeycomb units.

6. The honeycomb structure according to claim 1, wherein the inorganic material of the first form has a predetermined aspect ratio, and the inorganic material of the second form has an aspect ratio larger than the predetermined aspect ratio.

7. The honeycomb structure according to claim 6, wherein the aspect ratio of the inorganic material of the second form is about 2 to about 1000.

8. The honeycomb structure according to claim 1, wherein the ceramic particles comprise at least one of alumina, silica, zirconia, titania, ceria, and mullite.

9. The honeycomb structure according to claim 1, wherein the inorganic fiber comprises at least one of alumina, silica, silicon carbide, silica-alumina, glass, potassium titanate, and aluminum borate.

10. The honeycomb structure according to claim 1, wherein the porous honeycomb units further include an inorganic binder,
wherein the inorganic binder comprises at least one of alumina sol, silica sol, titania sol, water glass, sepiolite, and attapulgite.

11. The honeycomb structure according to claim 1, wherein a catalyst component is supported.

12. The honeycomb structure according to claim 11, wherein the catalyst component comprises at least one of alkaline metals, compounds of alkaline-earth metals, and oxides.

13. The honeycomb structure according to claim 1, wherein the joined porous honeycomb units comprise a part of an exhaust gas conversion unit for automobiles.

14. The honeycomb structure according to claim 1, wherein a cross-section of the through-hole is substantially triangular or substantially hexagonal.

15. The honeycomb structure according to claim 1, wherein a specific surface area for the porous honeycomb units is in a range from 38,000 to 42,000 $m^2/L$.

16. The honeycomb structure according to claim 1, wherein the honeycomb units have been fired at 600° C. to 1200° C.

17. A honeycomb structure comprising:
porous honeycomb units that 1) have multiple through-holes, and 2) include at least ceramic particles and inorganic fibers included in a body of and existing on outer longitudinally extending surfaces of the porous honeycomb units;
at least one of the porous honeycomb units having, perpendicular to the through-holes, an open cross-sectional area for fluid flow; and
sealing material layers jointing two or more of the porous honeycomb units to each other along the outer longitudinally extending surfaces of the porous honeycomb units,
wherein a specific surface area for the porous honeycomb units is in a range from 25,000 $m^2/L$ to 42,000 $m^2/L$.

18. The honeycomb structure according to claim 17, wherein the honeycomb units have been fired at 600° C. to 1200° C.

19. The honeycomb structure according to claim 17, wherein the specific surface area for the porous honeycomb units is in a range from 38,000 to 42,000 $m^2/L$.

* * * * *